Jan. 24, 1961
H. P. SEE
2,969,427
AUTOMATIC BROADCAST PROGRAMMING SYSTEM
Filed May 27, 1957
12 Sheets-Sheet 1
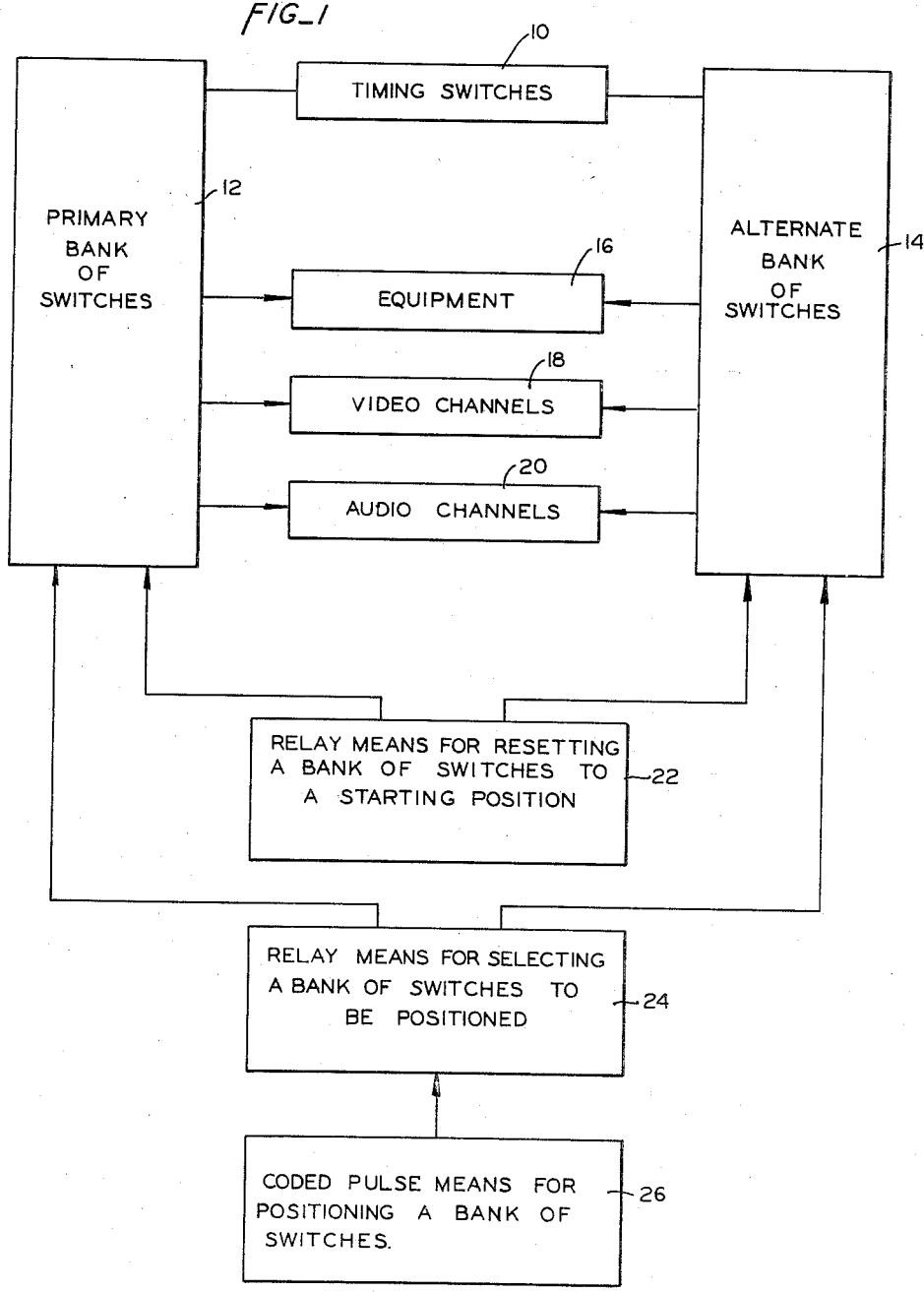
INVENTOR.
HAROLD P. SEE
BY
Naylor + Neal
ATTORNEYS

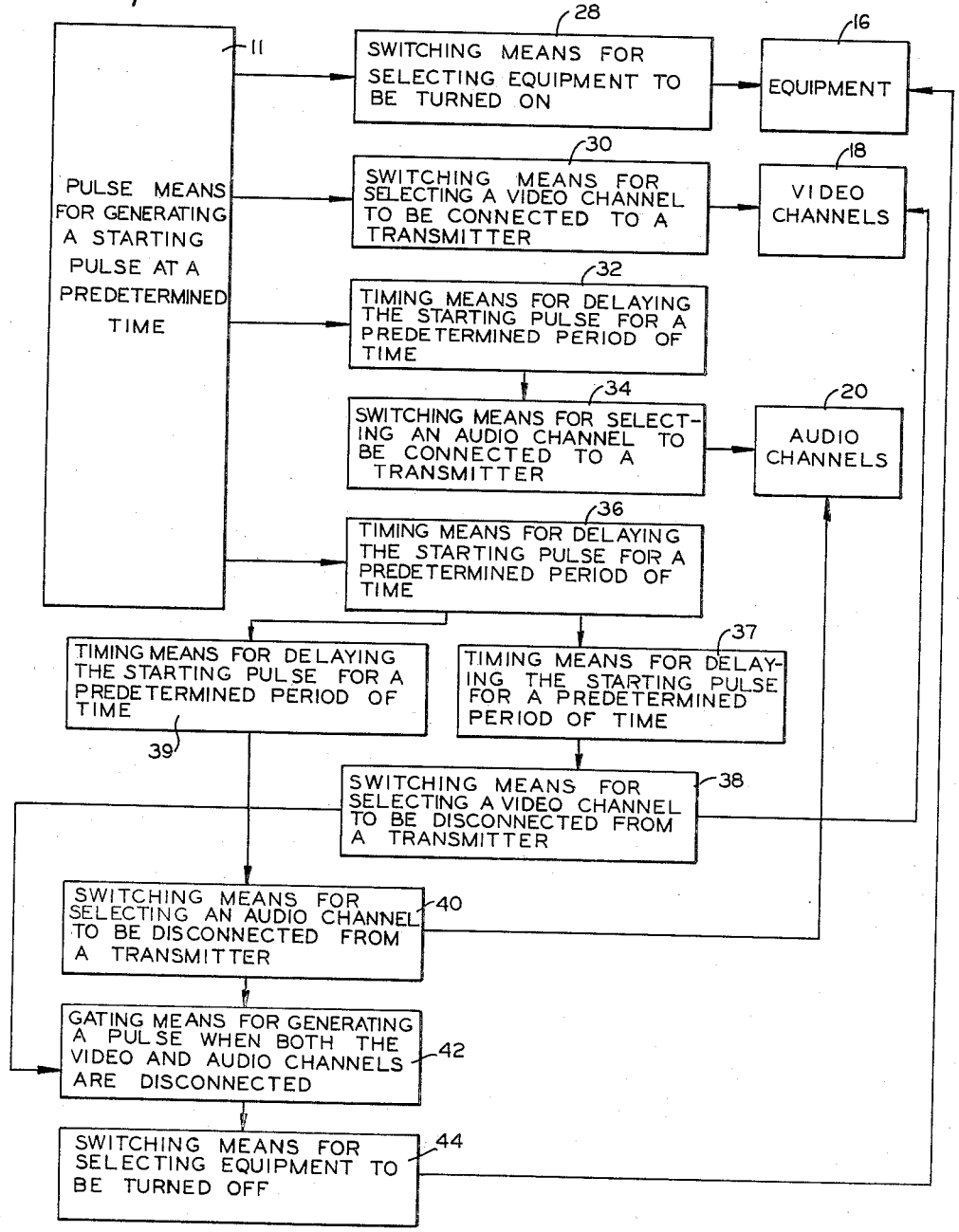

Jan. 24, 1961
H. P. SEE
2,969,427
AUTOMATIC BROADCAST PROGRAMMING SYSTEM
Filed May 27, 1957
12 Sheets-Sheet 3
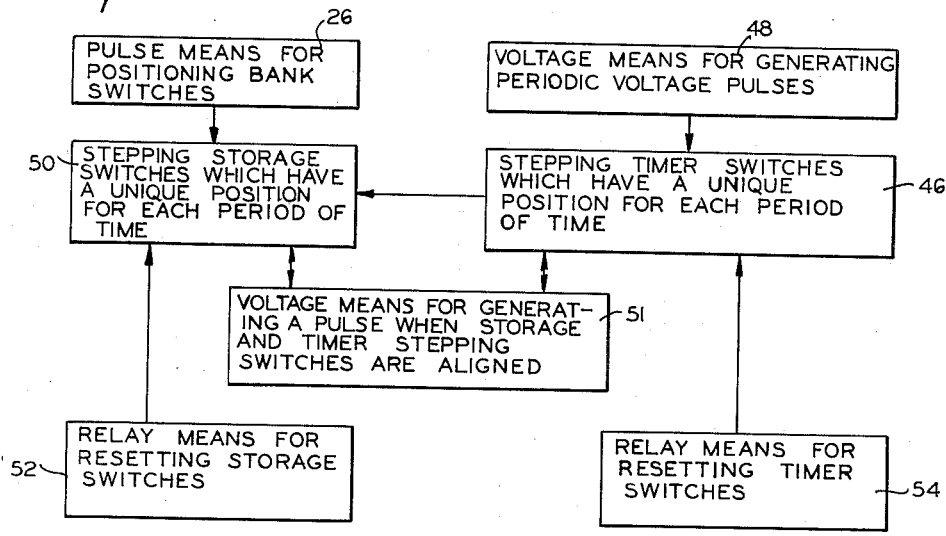
FIG_3
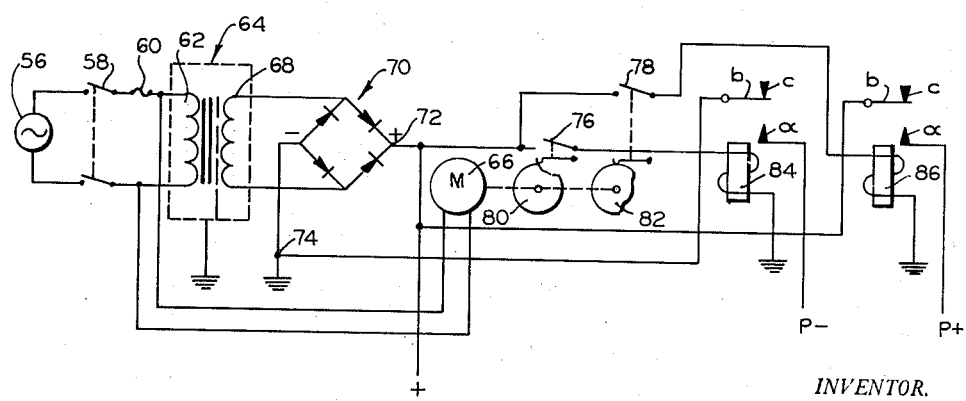
FIG_4
INVENTOR.
HAROLD P. SEE
BY
ATTORNEYS

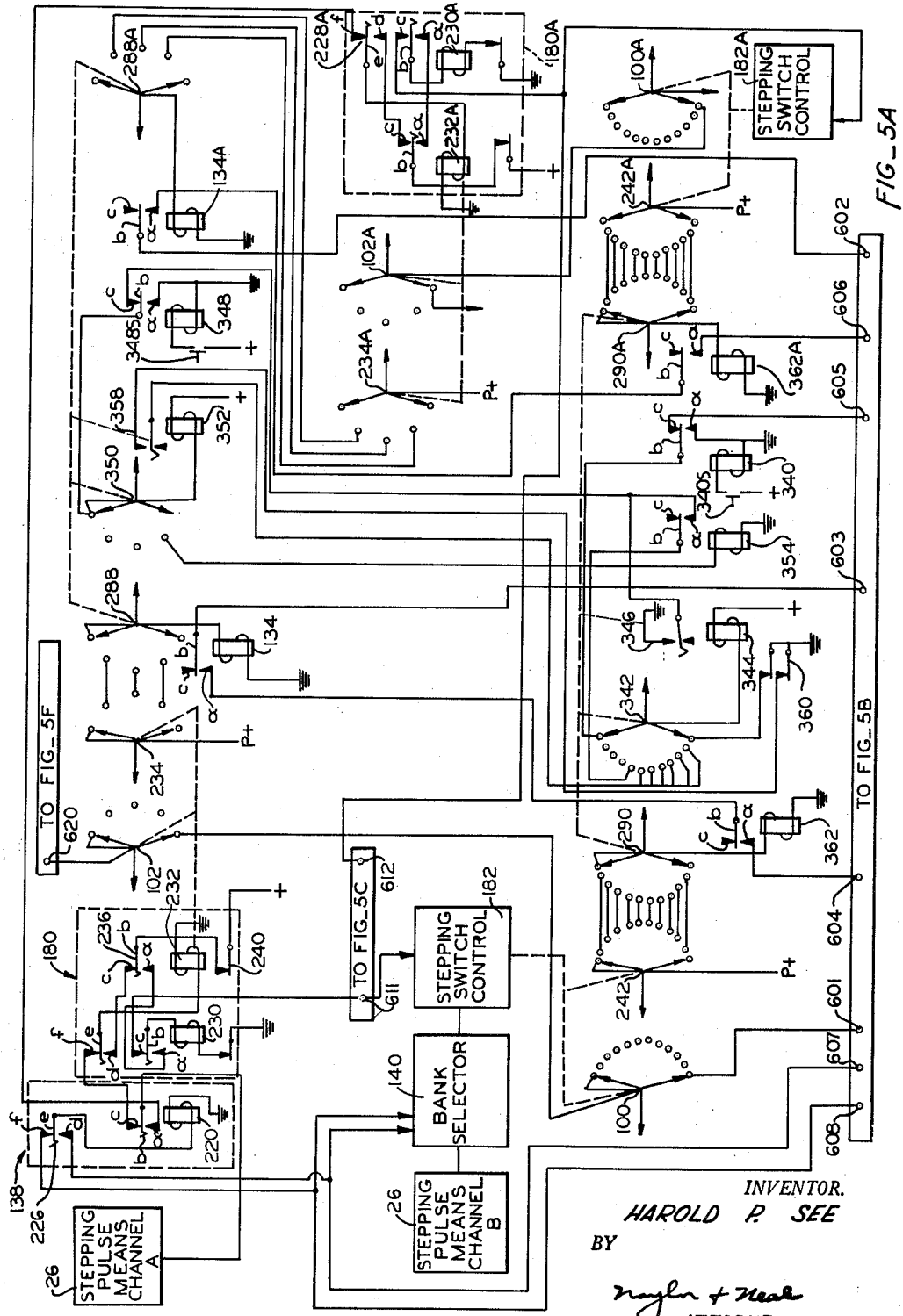

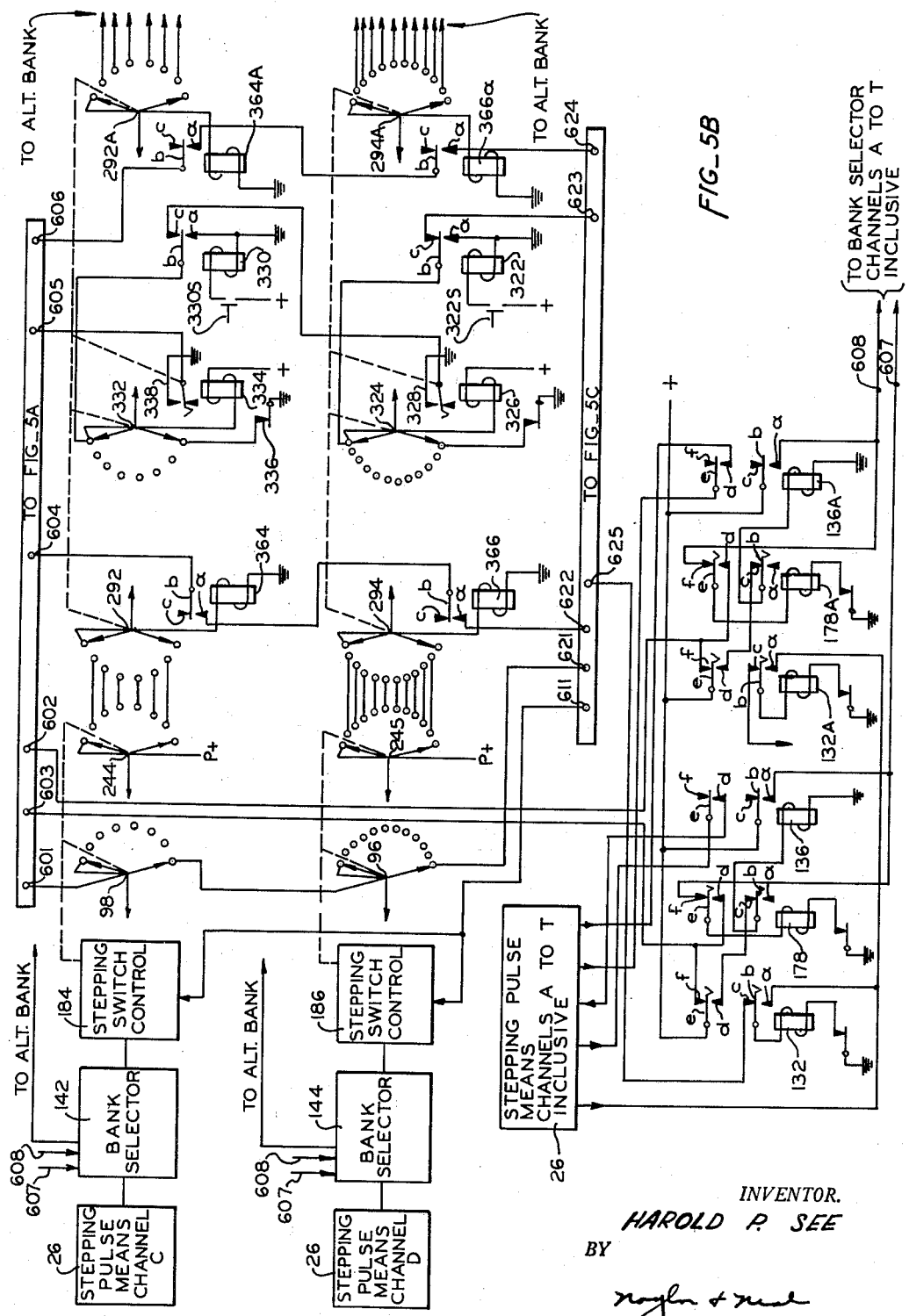

Jan. 24, 1961
H. P. SEE
2,969,427
AUTOMATIC BROADCAST PROGRAMMING SYSTEM
Filed May 27, 1957
12 Sheets-Sheet 6
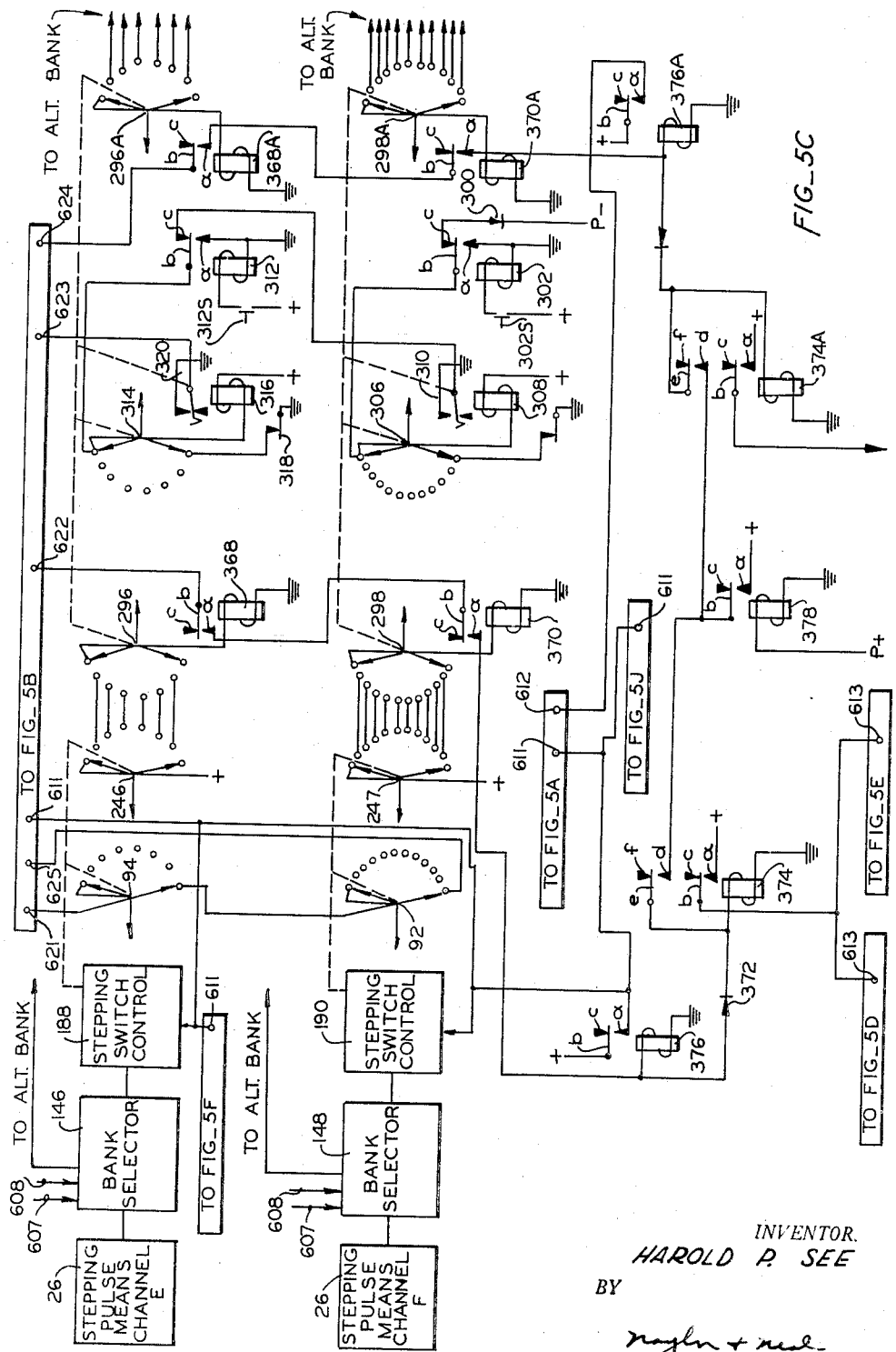
INVENTOR.
HAROLD P. SEE
BY
ATTORNEYS

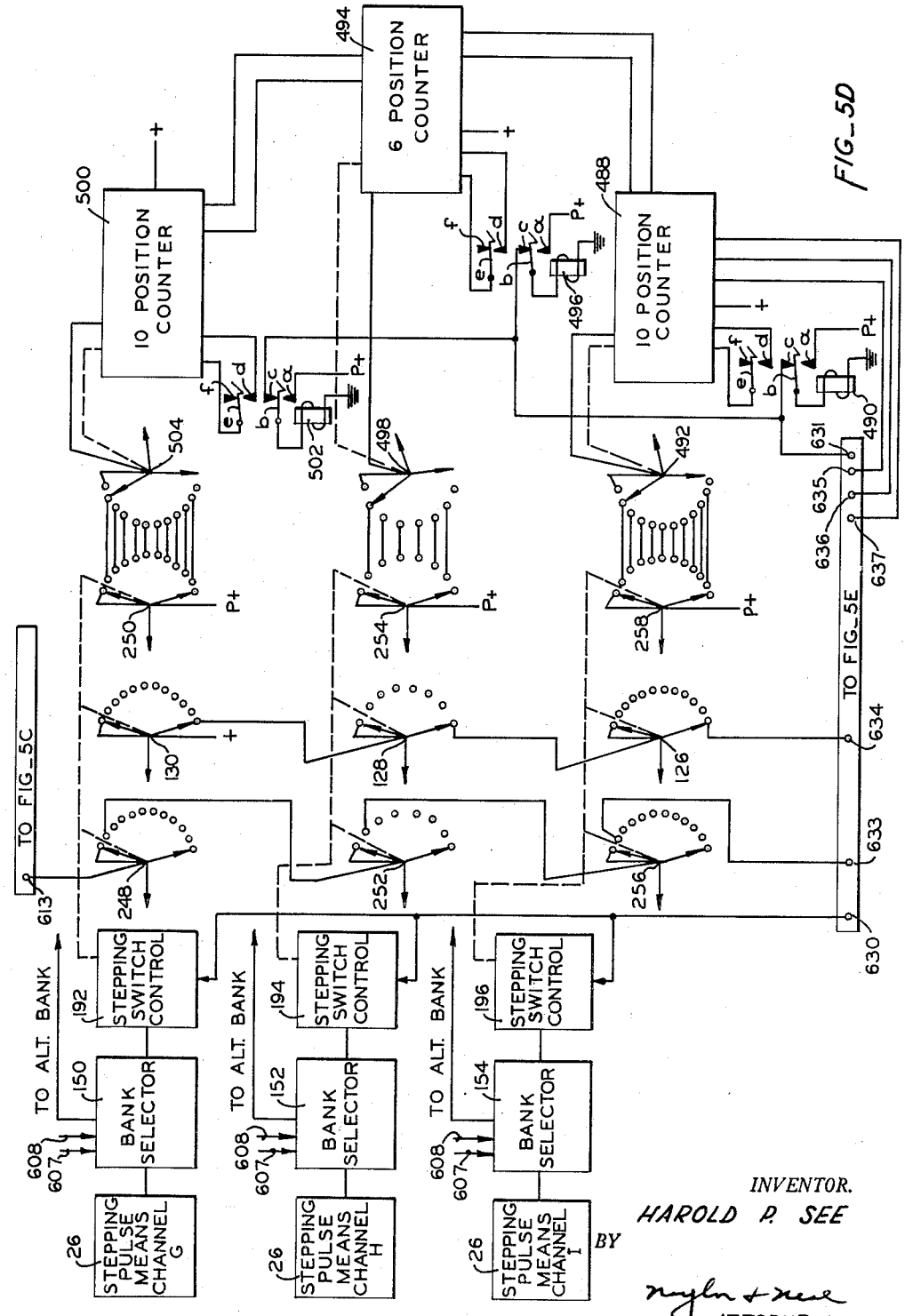

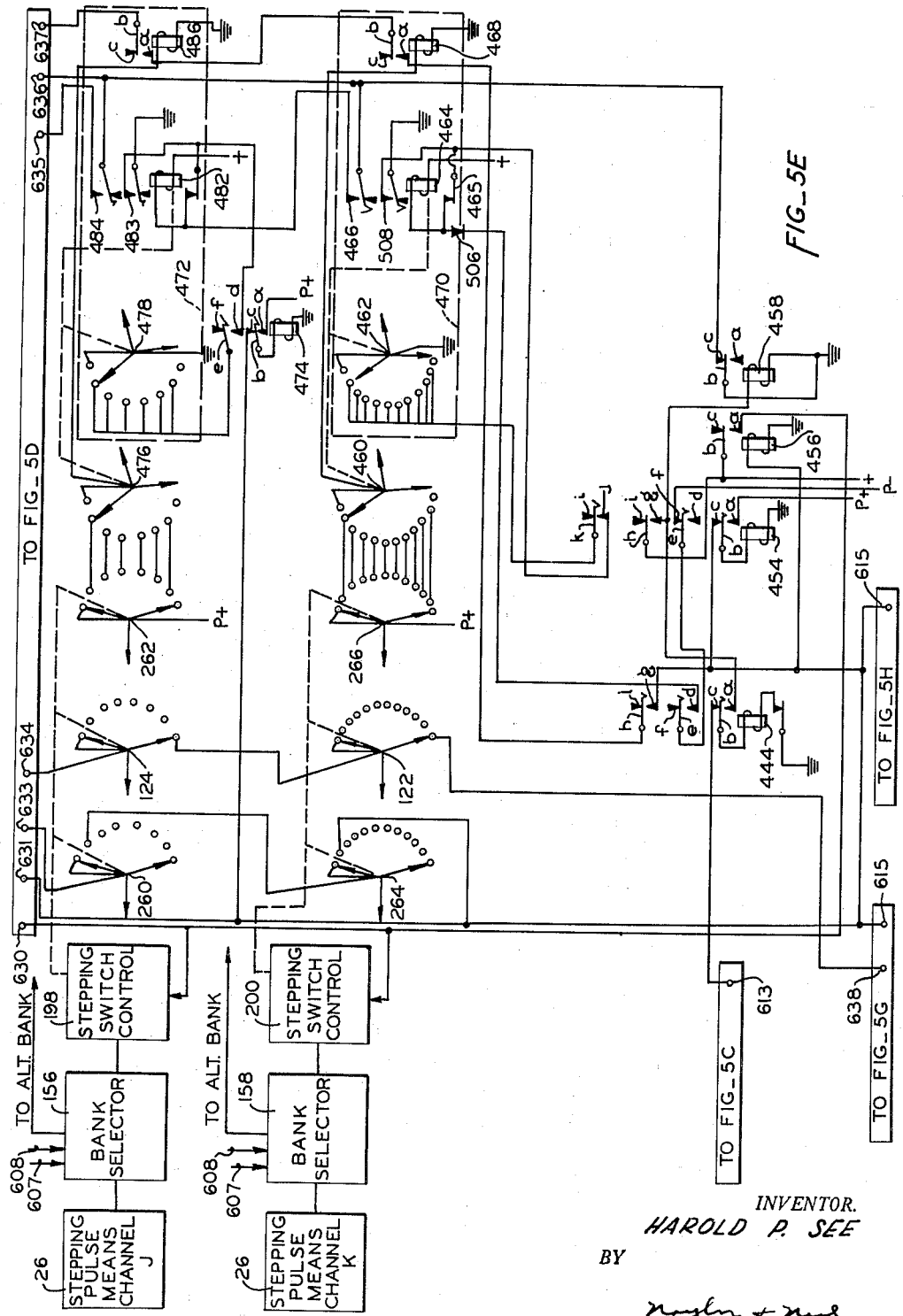

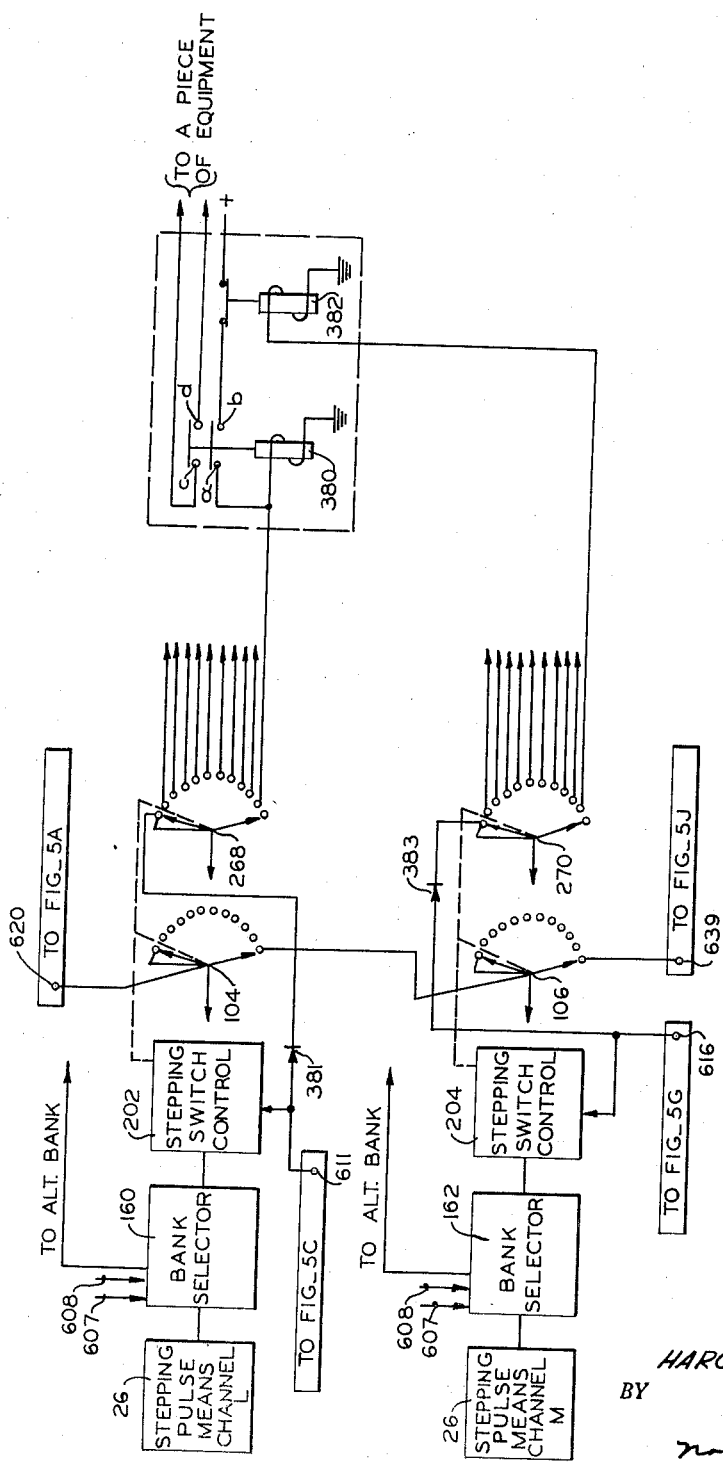

Jan. 24, 1961
H. P. SEE
2,969,427
AUTOMATIC BROADCAST PROGRAMMING SYSTEM
Filed May 27, 1957
12 Sheets-Sheet 10
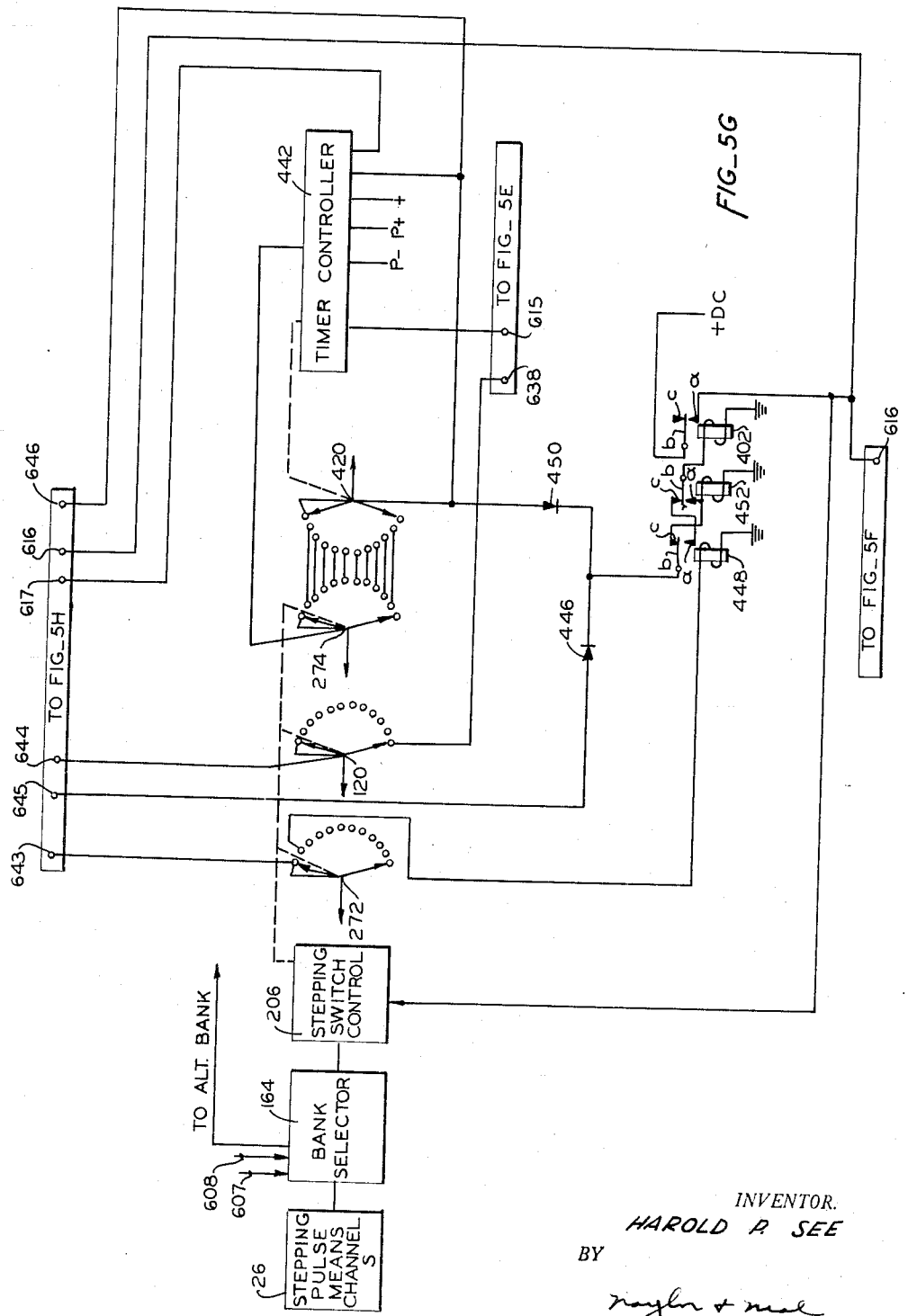
INVENTOR.
HAROLD P. SEE
BY
ATTORNEYS

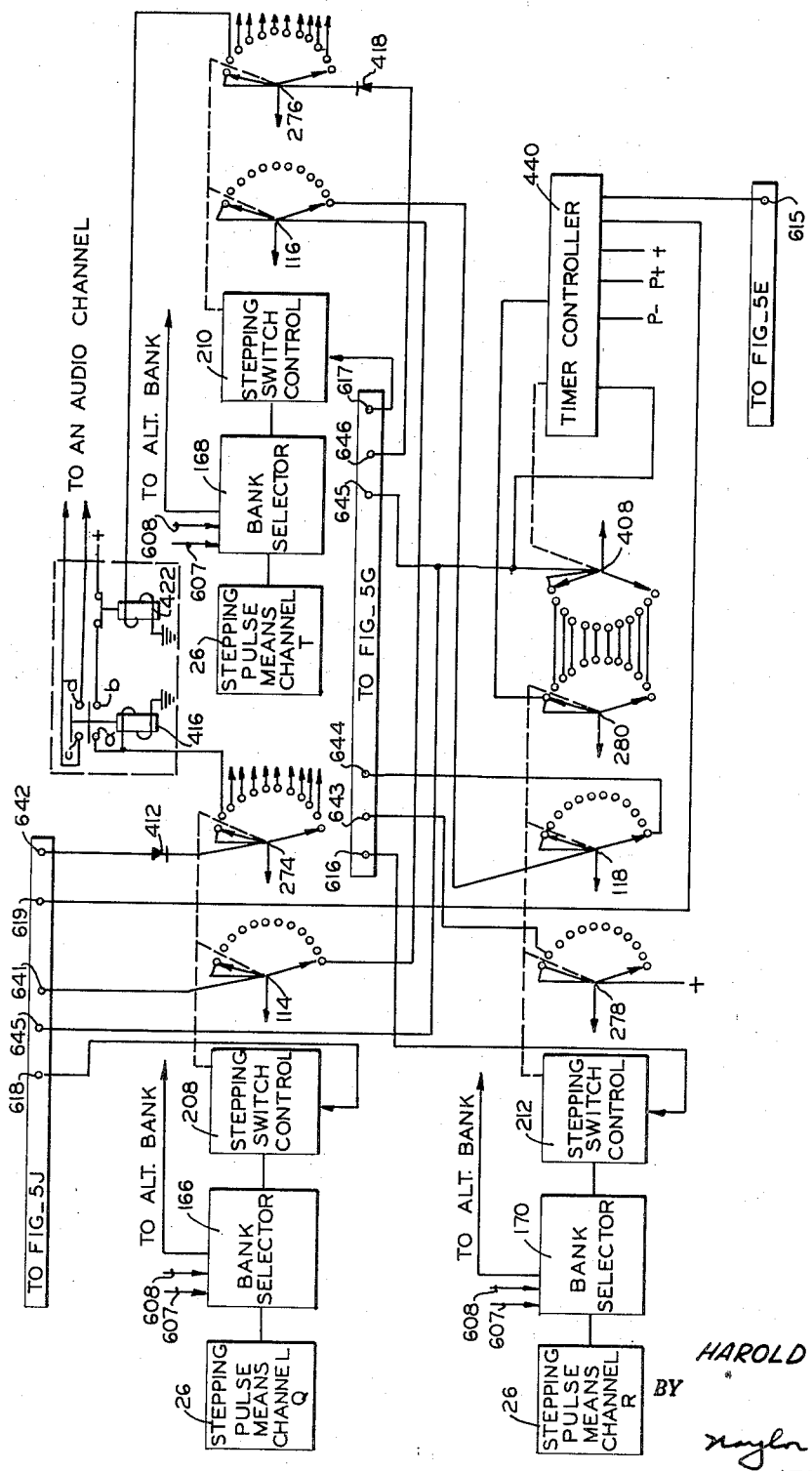

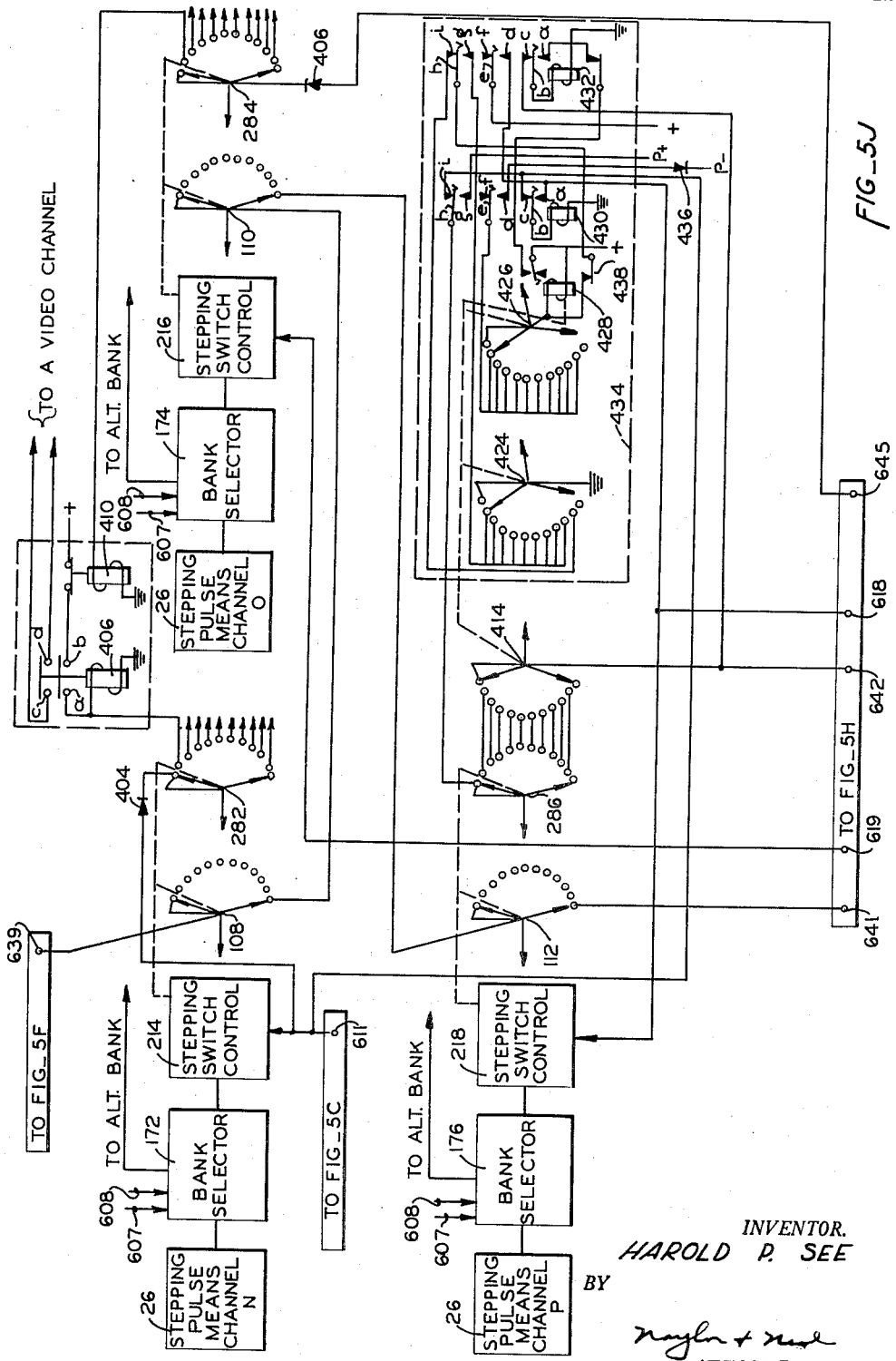

United States Patent Office 2,969,427
Patented Jan. 24, 1961

2,969,427

AUTOMATIC BROADCAST PROGRAMMING SYSTEM

Harold P. See, San Mateo, Calif., assignor to The Chronicle Publishing Company, San Francisco, Calif., a corporation of Nevada Filed May 27, 1957, Ser. No. 661,879

18 Claims. (Cl. 178—5.8)

This invention pertains to a means for programming a predetermined sequence of events, and more particularly to a means for automatically programming the complete operation of a television broadcasting station over a predetermined period of time, for example, a twenty-four hour period.

Many television broadcasting stations find that it is not economical to hire persons to operate the controls of their station for the entire period of the day. This is especially true for small stations in small towns whose programs are, for the most part, made up of recorded programs.

When a television station is manually switched, it frequently happens that the switching is not synchronized properly, thereby causing viewer confusion. Network connections are not made on time, programs are completed without new programs being switched in promptly, and advertising programs are cut off in the middle.

The device contemplated by this invention completely programs the control of a television broadcasting station over a twenty-four hour period, thereby achieving improved accuracy of program switching with a minimum of attendance. The device of this invention automatically turns lights on and off, starts and stops projecting equipment, starts and stops automatic display devices, connects and disconnects particular television cameras or channels to the television transmitter, connects and disconnects particular microphones, recording devices and other audio channels to an audio transmitter.

It is further contemplated that the device of this invention could be utilized to control other things than a broadcast station, for example, the device may be used to switch electrical circuits or to control mechanical operation at pre-determined times.

The device of this invention provides a complete television control package which completely operates the television station with improved accuracy and with a minimum of attended control.

In the programmer of this invention pulse means is provided for generating a starting pulse at a predetermined second during the twenty four hours of the day. The particular pulse means which is shown and described in the body of the specification utilizes stepping switches which are stepped one step per second and which repeat their position each twenty-four hour period. Associated with these timed stepping switches are two additional banks, denoted a primary and an alternate bank, of stepping switches which each have a unique position which corresponds with each second of a twenty-four hour period. The latter two banks of switches, called storage switches because the position of their movable arms represents stored information, are adapted to be preset, then to remain stationary and await the alignment of the first mentioned stepping switches which are stepping to a different position each second. When the first mentioned timed stepping switches comes into alignment with the storage switches of either one of the banks of storage stepping switches, the particular set of storage stepping switches which is aligned with the timed switches generates a pulse which starts a sequence of events.

There are two banks of storage stepping switches and timing means, a primary and alternate bank, which are utilized to control the turning on and off of various pieces of equipment and the connecting and disconnecting of the video and audio channels to their respective transmitters. Each bank of storage switches has some of its switches connected in parallel with certain storage switches of the other bank, as explained hereinafter, so that either bank can at any time control the turning on and off of different pieces of studio equipment and the connecting and disconnecting of audio and video channels to their respective transmitters.

The meaning of "primary" and "alternate" banks is not used herein in the sense that the primary banks are usually used and that the alternate banks are standby or emergency banks. Rather, the usage is one of denoting the bank which is being talked about at a particular time. Both banks of control switches are absolutely identical. In the interest of simplicity in presentation, portions of the alternate bank are shown in the drawings, but no attempt has been made to show a complete circuit diagram or to describe the alternate bank. The primary bank is shown schematically where it is considered necessary, and is shown by blocks where the circuitry is identical with a circuit which is shown schematically at another place in the circuit diagram or is described in the specification.

Commercially available stepping switches customarily have ten active taps or stationary terminals on each switching level. For convenience, switches with three, six and ten active taps are used herein to simplify the circuitry.

It is apparent that other switching circuits which have a unique switch position for each second of a twenty-four hour period can be adapted in accordance with this invention to generate a pulse at a predetermined time during a twenty-four hour period.

It is also apparent that a system of diode counters utilizing germanium or selenium diodes in combination with vacuum tube or gas tube counting circuits might have been substituted for the stepping switch circuits of this device without changing the spirit or scope of the invention.

The positioning of the storage stepping switches in the primary and alternate control banks is achieved by delivering a predetermined number of control pulses to each stepping switch. The pulses can be generated, for example, by means of separate channels recorded upon a magnetic tape record or a punched tape record, by means of punched cards, or by means of other pulse generating and information storing devices known to the art. In the preferred embodiment of this invention, punched cards are utilized which have a plurality of rows and columns. Each particular stepping switch is assigned a particular row or column and brushes are utilized to detect the position of holes in the punched cards. The position of a hole in the punched card determines the number of pulses which is delivered to a particular storage stepping switch.

To provide for the operation of the television stations over a twenty-four hour period, a stack of punched cards is placed in the punched card machine. The information from the punched cards is delivered to the programmer of this invention serially card after card as the information stored in the respective control banks is used. For example, information from the first card in the pile may be utilized to control the position of the stepping switches in the primary bank. As soon as the switches in the primary bank have been positioned, the first card is rejected by the punched card machine and the information from the second card is routed to the alternate bank to position the stepping switches therein. As soon as the stepping switches in the alternate bank have been positioned, the second card in the stack of cards in the card machine is rejected and the third card is positioned ready to deliver control pulses to the primary bank. However, for reasons which will be hereinafter described, information is not delivered from the third card to the primary bank until all of the control information in the primary bank has been used to control the pieces of equipment, and to control the audio and video channels. As soon as all of the stepping switches which have been positioned in the primary bank have been utilized to channel pulses to predetermined pieces of equipment and to predetermined audio and video channels, the primary bank returns to its initial position and a signal is sent to the card machine indicating that the primary bank of storage stepping switches is again ready to be set into new switch positions. The information on the third card is then channeled to the primary bank to reset the position of the storage stepping switches. The channeling of information from the card machine to the primary and alternate banks continues throughout the twenty-four hour period until the stack of cards is exhausted.

In a typical operating sequence, but the equipment is not limited to this sequence, information is channeled from the pulse means or card machine to cause the starting pulse means to generate and to deliver a starting pulse at a particular time to the primary bank, and to cause the primary bank to channel the starting pulse to a particular first piece of equipment, for example, the control relay for the motor of a moving picture projector. The second card of the card machine or stepping pulse means causes the starting pulse means to deliver a starting pulse to the alternate bank at a time, usually some time after delivering the above mentioned starting pulse to the primary bank. The second card also causes the alternate bank to channel the starting pulse delivered to it to a second piece of selected equipment, for example, the control relay for the projection lamp douser on the moving picture projector which was just started by the primary bank. In the meantime, the third card in the card machine or stepping pulse means has repositioned the starting pulse means of the primary bank to cause the starting pulse means to deliver a starting pulse to the primary bank at some time following the lighting of the mentioned projection lamp. The third card also positions the stepping switches within the primary bank to cause the starting pulse to be delivered to a relay which connects a preselected video channel to the video transmitter, for example, the video camera associated with the moving picture projector previously mentioned. The starting pulse also is delivered to a first timing means which immediately starts counting off time for a predetermined period, the duration of which is controlled by the position of one of the storage stepping switches of the primary bank, which is positioned in accordance with information punched on the third card. After a predetermined period of time the first timing means delivers a pulse to another storage stepping switch, which has been preset in accordance with information punched on said third card, and which connects an audio channel, for example, the audio channel associated with the previously mentioned moving picture projector, to an audio transmitter. The starting pulse is also delivered to a second timing means which measures out a program segment in accordance with the position of a set of storage stepping switches which are positioned by the stepping pulse means or the punched card machine in accordance with information punched on the third card. At the end of the program segment the second timing means delivers a pulse to another pair of previously positioned storage stepping switches which disconnect the video and audio channels from the video and audio transmitters, respectively. Time delay means are preferably inserted so that either the video or audio channels may selectively be disconnected before the other. A gating means is provided to deliver a pulse to still another storage stepping switch, which has been previously prepositoned by the pulse stepping means, when both the audio and video are disconnected from their respective transmitters, to deliver a pulse to turn off the pieces of equipment which had previously been turned on.

It is therefore an object of this invention to provide a means for automatically programming a sequence of controllable events.

It is another object of this invention to provide means for automatically programming a television broadcasting station for a predetermined period of time.

It is another object of this invention to provide means for automatically programming a television broadcasting station for a period of twenty-four hours.

It is still another object of this invention to provide a programming system for controlling a number of separate control elements in different pieces of equipment, wherein the pieces of equipment are divided into controllable groups.

It is another object of this invention to provide means for controlling particular pieces of equipment within predetermined groups of said pieces of equipment in accordance with a predetermined time sequence.

It is a more particular object of this invention to provide means for generating a starting pulse at a predetermined time, switching means adapted to select a particular piece of equipment from a group of pieces of equipment and to channel a starting pulse thereto to turn the selected piece of equipment on, to provide switching means for selecting a particular video channel to be connected to a video transmitter and for channeling a starting pulse thereto, to provide means for delaying the starting pulse and for delivering the delayed starting pulse to means for connecting a predetermined audio channel to an audio transmitter, to provide additional timing means for delaying the starting pulse for a predetermined period of time and for delivering a delayed pulse to additional switching means adapted to disconnect audio and video channels from their respective transmitters after a predetermined program segment, and gating means in combination with switching means adapted to deliver a pulse to predetermined pieces of equipment within a group of said pieces after said audio and said video channels have been disconnected from their respective transmitters.

It is also a further object of this invention to provide an efficient, automatic, programming system particularly designed to provide a package for controlling a television station automatically, with greatly improved accuracy of program switching and with the minimum of attendance, over a twenty-four hour period.

Other objects will become apparent from the following description taken in connection with the accompanying drawings:

Fig. 1 is a block diagram of a typical system of this invention;

Fig. 2 is a block diagram of one bank of the switches utilized in this invention;

Fig. 3 is a block diagram showing the functional connection between a set of timer stepping switches and a set of storage stepping switches utilized in a typical timer of this invention;

Fig. 4 is a schematic diagram of a typical voltage supply used in this invention;

Fig. 5, consisting of parts 5A, 5B, 5C, 5D, 5E, 5F, 5G, 5H and 5J, is a schematic and block diagram of a typical programmer in accordance with this invention.

A typical system in accordance with this invention is shown in Fig. 1. In Fig. 1, timing switches 10 are common to both the primary bank of switches 12 and the alternate bank of switches 14. Timing switches 10 have a unique switching position for each second of the twenty-four hour period and continuously repeat themselves each twenty-four hours. The primary bank of switches 12 and the alternate bank of switches 14 are identical in every respect.

Although the alternate bank of switches 14 will be referred to occasionally herein and although fragments of the alternate bank of switches will be shown in portions of Fig. 5, the alternate bank of switches is not described. Wherever shown in Fig. 5 the parts pertaining to the alternate bank of switches are given the same numbers as the corresponding parts of the primary bank of switches with "A" after the number. Portions of the schematics of alternate bank 14 which are shown in Fig. 5 commonly have open leads because the showing is fragmentary. No further explanation of these open leads is given.

Both the primary bank 12 and alternate bank 14 are connected to common terminals of equipment 16, video channels 18, and audio channels 20 as well as to timing switches 10. Relay means 22 is adapted to reset a predetermined bank of switches to their initial or starting position. Pulse means 26 is adapted to position the switches of either primary bank 12 or alternate bank 14 in accordance with the position of relay means 24.

Fig. 2 shows a block diagram of the primary bank of this invention. Pulse means 11 is adapted to generate a starting pulse at a predetermined time. Pulse means 11 includes the portion of timing switches 10 which are associated with primary bank 12, together with a corresponding set of storage stepping switches within primary bank 12, as explained more fully hereinafter in connection with Figs. 3 and 5. At a predetermined time, pulse means 11 delivers a starting pulse to switching means 28 and 30, and to timing means 32 and 36. Switching means 28 is positioned to channel the pulse from pulse means 11 to a predetermined piece of equipment 16 to thereby turn that piece of equipment on. Switching means 30 is adapted to channel pulses from pulse means 11 to a predetermined set of switches on a predetermined video channel to connect a particular video channel to a video transmitter. Timing means 32 is adapted to delay the pulse from pulse means 11 for a predetermined period of time, then to channel said pulse to switching means 34 which is adapted to further channel said pulse to a predetermined switching means on audio channels 20 adapted to connect a predetermined audio channel to an audio transmitter. Timing means 36 is adapted to delay the starting pulse from pulse means 11 for a predetermined period of time, marking out the length of a program segment, at which time it delivers a pulse to timing means 37 and to timing means 39, which then further delay the pulse for separate predetermined periods of time and then channels pulses to switching means 38 and 40 to turn off a predetermined video channel 18 and audio channel 20. When both the video channels 18 and audio channels 20 have been turned off, gating means 42 is activated which channels a pulse to switching means 44 which is adapted to turn off predetermined selected pieces of studio equipment 16.

The storage stepping switches on switching means 28, 30, 34, 40 and 44 and the storage stepping switches upon timing means 32, 36, 37 and 39 are positioned by pulses from pulse means 26 through relay means 24, as shown in Figs. 1 and 5.

Fig. 3 is a block diagram of a typical timing means, such as timing means 32 or 36. Pulse means 10 is, in the preferred embodiment of this invention, also a timing means. The essential difference between pulse means 10 and the other timing means is that pulse means 10 operates continuously while the other timing means must receive a starting pulse to start them operating. Each timing means has two main stepping switch elements, a set of storage stepping switches and a set of timed stepping switches. Each of these stepping switch elements may be a single stepping switch or a plurality of stepping switches connected to count a large number of steps. Timer stepping switches 46 are stepped by means of a voltage means 48 adapted to generate periodic voltage pulses. Storage stepping switches 50 are identical to switches 46 but are adapted to be positioned by means of a pulse means 26 which is adapted to channel a predetermined number of pulses to each switch. When the timer switches 46 and storage switches 50 are in alignment, that is, when their movable arms are positioned on the corresponding contacts of the individual banks of switches, a voltage pulse is generated at the output of the timer. After a pulse is generated, but not necessarily immediately afterward, relay means 52 resets storage switches 50 to their initial position. Similarly, in the case of all timer switches except pulse means 10, timer stepping switches 46 are reset to their initial position, after they have been used, by means of a relay means 54. It is to be noted the way in which pulses are generated when the movable arms of timer switch 46 and storage switch 50 are in alignment is that a voltage is applied to one of the movable arms which then feeds through from one stationary contact to the other stationary contact and then to the second movable arm.

In Fig. 4 is shown a typical power supply adapted to be utilized in the particular programming device in this invention. Alternating voltage source 56 is connected through starting switch 58 and fuse 60 to the primary winding 62 of transformer 64 and to motor 66 which is a synchronous motor which is adapted to rotate once every second. Secondary winding 68 of transformer 64 is connected through a bridge rectifier 70 to generate a direct voltage at terminals 72 and 74. Negative terminal 74 is preferably grounded. Positive terminal 72 is connected throughout Fig. 5 to all points marked with a plus sign (+), while negative terminal 74 is connected to all terminals marked with the ground symbol. It was considered preferable to use a plus and ground symbol rather than to carry wires throughout the diagram, in order to reduce the number of lines and simplify the drawings.

The direct voltage between terminals 72 and 74 is chopped in two branches by means of chopping switches 76 and 78. Switch 76 is controlled by means of chopping cam 80 which is connected to the shaft motor 66 and which rotates once every second to cause switch 76 to close every second for a short period of time. Switch 78 is connected to be controlled by chopping cam 82 which is connected to the shaft motor 66 and which rotates once each second. Chopping device 82 causes switch 78 to close once each second. It is to be noted that, in a preferred embodiment, the length of closing of switch 76 is very short while the length of time of closing of switch 78 is approximately one-third of a second. The pulse generated by the closing of switch 78, as described hereinafter, is utilized as a work pulse to close the switches and other control elements of the various pieces of studio equipment and to connect and disconnect the control elements of the audio and video channels previously described. The pulses generated by switch 76, as described more fully hereinafter, are utilized as timing pulses to step the timing switches of each of the pieces of timing apparatus, to be described more fully hereinafter.

Switch 76 is connected to control relay 84 which, in turn, chops the negative voltage which appears at terminal P—. The action of switch 78 operates relay 86 which generates a pulsed positive voltage at terminal P+. Throughout the schematic diagram of Fig. 5 all elements which connect to P— have been labeled P— and all elements which are to be connected to terminal P+ have been labeled P+. This was done in order to eliminate a large number of lines on the drawings. It should be further noted that the positive voltage need not be generated by means of a rectifier but that any other direct current voltage source may be utilized. Also note that synchronous motor 66 need not be used but that any other constant speed motor may also be used provided the shaft of choppers 80 and 82 is caused to turn at the proper speed. It is further to be emphasized that chopping devices are not the only means for generating a pulsed voltage but that other equivalent means may be utilized.

*Relay means for selecting a bank of switches to be positioned*

In the circuits which follow, some of the relays are adapted to first route a pulse, then to utilize the same pulse to transfer the relay. It is to be understood that whenever such routing is desired before the relay transfers, that this action may conveniently be accomplished by utilizing the applied pulse to wind up a mechanical transfer mechanism which transfers the relay at the end or trailing edge of the pulse. Several kinds of switches of the wind-up kind are commercially available.

In Fig. 5B, relays 132, 178, 136, 132A, 178A and 136A are portions of relay means 24 as shown in Fig. 1. Relays 132, 178, and 136 are adapted to generate a voltage which causes the primary bank 12 to be receptive to pulses from stepping pulse means 26. Relay means 132A, 178A and 136A are identical to relays 132, 178, and 136, respectively, except that they are associated with the alternate bank of switches and will not be further described herein.

The + terminal of Fig. 4 is connected to one level of switches on each of the sets of stepping switches which are adapted to be positioned by external stepping pulses from stepping pulse means 26. When each of the switches, which is adapted to be positioned by stepping pulse means 26, is in its initial or starting position, a series circuit is created from the + terminal of Fig. 4 through stepping switch level 130, 128, and 126 in Fig. 5D, through terminal 634, stepping switch levels 124 and 122 in Fig. 5E, through terminal 638, stepping switch levels 120 in Fig. 5G, through terminal 644, stepping switch levels 118, 116 and 114 in Fig. 5H, through terminal 641, stepping switch levels 112, 110 and 108 in Fig. 5J, through terminal 639, stepping switch levels 106 and 104 in Fig. 5F, through terminal 620, stepping switch levels 102 and 100 in Fig. 5A, through terminal 601, stepping switch levels 98 and 96 in Fig. 5B, through terminal 621, stepping switch levels 94 and 92 in Fig. 5C, through terminal 625 to terminal c on relay 132. Hence, when all of the just mentioned stepping switches are in their initial or starting positions a positive voltage is applied to terminal c of relay 132.

Relay 132 is of the type which requires a pulse to change arms b and e from position c and f to position a and d and another pulse to retransfer arms b and e back to their original position. Arms b and e are initially in their upward position so that the coil of relay 132 is connected to receive voltage from the series circuit connected to terminal c of relay 132.

Stepping pulse means 26 is connected, as hereinafter described, to position the storage stepping switches of the primary and alternate banks of switches. Stepping pulse means 26 has a plurality of channels each connected to a different one of the individual storage stepping switches, and, in addition, has a channel which is adapted to generate a pulse after each program has been fed into an individual bank, i.e. the primary or alternate bank of storage stepping switches. This latter pulse is connected to terminals a of relays 132 and 132A.

When relay 132 is in its arm upward position, the + terminal of Fig. 4 is connected through arm e and terminal f of relay 132 to terminal d of relay 178 and through terminal 603 to arm b of relay 134 in Fig. 5A. The voltage on terminal d of relay 178 causes relay 178 to remain in its arm upward position as long as relay 132 is in its arm upward position. The voltage on arm b of relay 134 is a voltage supply for the output voltage of the primary bank of pulse means 11.

When the storage stepping switches are in their initial positions, a voltage is applied to terminal c of relay 132 to cause relay 132 to cycle. When relay 132 cycles to its arm downward position, arm b is connected to terminal a which is adapted to receive a pulse from stepping pulse means 26 for repositioning relay 132. Voltage is momentarily applied through arm e and terminal d of relay 132 to terminal c and arm b of relay 178 to the coil of relay 136 which causes relay 136 to transfer. When relay 136 transfers to its arm downward position, arm e contacts terminal d of relay 136 which causes stepping pulse means 26 to cycle to feed a new set of pulses to the storage stepping switches. The circuit through which stepping pulse means 26 feeds stepping pulses to the storage stepping switches is described hereinafter. When relay 136 closes, the + terminal of Fig. 4 is connected through arm b and terminal a of relay 136 to conductor 607 which, in turn, is connected to each of the bank selectors associated with the storage stepping switches. Relay 136 is held closed until relay 132 or relay 178 cycles.

Terminal f of relay 178 is connected to conductor 607 so that when conductor 607 is energized, relay 178 is caused to transfer. Relay 178 then requires another voltage pulse on its coil to retransfer back to its original position. When relay 178 transfers, the coil of relay 136 opens which causes arms b and e of relay 136 to return to their arm upward position. Energizing of conductor 607 causes the bank selectors of the various storage stepping switches, as described hereinafter, to channel pulses from stepping pulse means 26 to the primary bank of switches.

Since relays 132A, 178A and 136A are identical to relays 132, 178 and 136, conductor 608 is energized momentarily when relay 136A is closed. Conductor 608 is connected to each of the bank selectors to cause the bank selectors to channel pulses from stepping pulse means 26 to the alternate bank of storage stepping switches.

When stepping pulse means 26 has fed all of its pulses to the various storage stepping switches, a pulse is generated at terminals a of relays 132 and 132A to cause them to return to their arm upward position. When relay 132 moves into its arm upward position, arm e contacts terminal f of relay 132 to place a voltage upon the coil of relay 178 through terminal d and arm e of relay 178. This voltage causes relay 178 to recycle to its arm upward position. Relay means 24 is now positioned to repeat the operation to reposition a set of storage stepping switches.

*Pulse means for generating a starting pulse at a predetermined time*

In Fig. 5A, stepping switches 102 and 234 are adapted to be positioned by means of stepping switch control 180. Pulses are channeled from stepping pulse means 26 to either stepping switch control 180 or 180A depending upon the position of the arms b and e of relay 220 of bank selector 138. At the start of a series of pulses of stepping pulse means 26, either conductor 607 or conductor 608 is momentarily energized to cause a voltage to be applied to terminals d or f of relay 220. If arm e of relay 220 is in contact with the terminal which is energized, a voltage is applied to the coil of relay 220 which causes relay 220 to cycle and channel pulses to the appropriate one of stepping switch controls 180 or 180A.

Relay 230 is of the type which requires a separate pulse to cause arms b and e to be cycled from one set of contacts to the other and requires an additional pulse to return arms b and e to their original position. When pulses are channeled to arm b and contact c of relay 220 to contact f of relay 230, relay 230 is in its arm upward position. Pulses are then channeled through arm e of relay 230 to the coil of stepping relay 232 to cause stepping relay 232 to index stepping switch levels 102 and 234 one step for each pulse which is received by the coil of relay 232.

Terminal *c* of relay 230 is connected to terminal 611, shown in Fig. 5C. Voltage is applied to terminal *c* of relay 230 when relay 376 in Fig. 5C is energized and closed to cause the + terminal of Fig. 4 to be connected through arm *b* and terminal *a* of relay 376 to terminal 611.

When a voltage is applied to terminal *c* of relay 230, and when arms *b* and *e* of relay 230 are in their arm upward position, a voltage is applied through the actuating coil of relay 230 to cause relay 230 to transfer to move arms *b* and *e* into a downward position. When relay 230 is in its arm downward position, the + terminal of Fig. 4 is connected through switch 240, terminal *c* of switch 236, terminal *d* of relay 230 to the coil of relay 232 to cause relay 232 to index. Switch 240 is of the type to cause relay 230 to continue to index until the circuit is opened.

One kind of relay which is adapted to be used with relay 232 and which uses a switch such as switch 240 operates with a self-interrupting action. One kind of self-interrupting relay utilizes a mechanical transfer mechanism which winds up or is cocked when a voltage is applied, and which transfers or steps the relay when the voltage is removed. It may be seen by referring to the relay 232 and switch 240 that if switch 240 is opened by the cocking action of the mechanical transfer mechanism, when the voltage is applied to the coil of relay 232 through switch 240, the opening of switch 240 causes relay 232 to transfer or step. As soon as switch 240 re-closes, the mechanical transfer mechanism is re-wound and the action is repeated continuously until the applied voltage is removed.

Switch 236 is cammed to the shaft of relay 232 to cause switch 236 to move into its arm downward position when relay 232 reaches its initial or zero position. When relay 232 reaches its initial or zero position, switch 236 moves to its arm downward position to cause the + terminal of Fig. 4 to be connected through switch 240, terminal *a* of switch 236, terminal *a* of relay 230 and the coil of relay 230 to cause relay 230 to retransfer into its arm upward position, at which time it is then receptive to channel a new series of pulses from stepping pulse means 26 to the coil of relay 232.

Each of the storage stepping switches has a stepping switch control which is identical to stepping switch control 180. Each of the stepping switch controls associated with the storage stepping switches has a bank selector identical with bank selector 138 associated therewith to select either the primary or alternate bank. Hence it follows that the following numbered bank selectors and stepping switch control are identical in every respect to bank selector 138 and stepping switch control 180, respectively; bank selectors 140, 142, 144, 146, 148, 150, 152, 154, 156, 158, 160, 162, 164, 166, 168, 170, 172, 174 and 176; stepping switch controls 182, 184, 186, 188, 190, 192, 194, 196, 198, 200, 202, 204, 206, 208, 210, 212, 214, 216, 218 and each of the stepping switch controls of the alternate bank such as stepping switch control 180A of Fig. 5A. It is to be noted that each of the mentioned bank selectors are connected to terminals 607 and 608 of Fig. 5B to receive their control.

The storage stepping switches associated with stepping pulse means 26 channels, A, B, C, D, E and F together with their associated timing switches are included in pulse means 611 and are adapted to generate a pulse at a predetermined time during a twenty-four hour period. The storage stepping switches associated with channel A of stepping pulse means 26, namely switches 102 and 234 are positioned to represent the particular ten hour period during a twenty-four hour period in which it is desired to generate a pulse. For example, if the pulse is to be generated between midnight and 10 a.m., switches 102 and 234 are moved to their number one position, if the pulse is to be generated between 10 a.m. and 8 p.m., switches 102 and 234 are moved to their number two position, and if the pulse is to be generated between 8 p.m. and midnight, switches 102 and 234 are moved to their number three position. Each of the first two positions of switches 102 and 234, therefore, represent a ten hour segment while the third position represents a four hour segment.

The storage stepping switches 100 and 242 associated with channel B of stepping pulse means 26 are positioned to designate a particular hour within a particular ten hour or four hour segment designated by the picture of storage stepping switches of channel A. For example, if a pulse is to be generated between midnight and 1 a.m. storage switches 100 and 242 are positioned on their first position, if a pulse is to be generated between 1 a.m. and 2 a.m., switches 100 and 242 are positioned on their second position, if a pulse is to be generated between 2 a.m. and 3 a.m., switches 100 and 242 are positioned on their third position, and if a pulse is to be generated between 3 a.m. and 4 a.m. switches 100 and 242 are positioned on their fourth position. The additional positions correspond to the remaining six hours of a ten hour period. For the hours between 8 p.m. and 12 p.m., of course, switches 100 and 242 are positioned only on the first four positions respectively.

Switches 98 and 244, controlled by stepping switch control 184 in response to the pulses on channel C of stepping pulse means 26, are adapted to designate a particular ten minute period within each hour. For example, if the time at which a pulse is to be generated is between midnight and ten minutes after midnight, switches 98 and 244 are positioned on their first position, if the time at which a pulse is to be generated is between ten minutes after midnight and twenty minutes after midnight, switches 98 and 244 are positioned on their second position. In this fashion, switches 98 and 244 are adapted to have a unique position for each ten minute period within the hour.

Switches 96 and 245 are adapted to have a unique position for each minute of a ten minute period and are positioned by stepping switch control 186 in response to the pulses of channel D of stepping pulse means 26. For example, if a pulse is to be generated between midnight and one minute after midnight, switches 96 and 245 are positioned in their first position, if a pulse is to be generated between one minute after midnight and two minutes after midnight, switches 96 and 245 are positioned on their second position. There are corresponding positions for each minute up to ten minutes. If an eleventh minute is to be designated, switches 96 and 245 are again positioned in a number one position while previously mentioned switches 98 and 244 are indexed an additional step.

Switches 94 and 246 are adapted to have a unique position for each ten second period within each minute and are positioned in response to channel E of pulse means 26. For example, if a pulse is to be generated between midnight and ten seconds after midnight, switches 94 and 246 are positioned in their first position, if a pulse is to be generated between ten seconds after midnight and twenty seconds after midnight, switches 94 and 246 are positioned in their second position. There is an additional unique position for each ten second period of each minute.

Switches 92 and 247 are positioned by stepping switch control 190 in response to the pulses registered on channel F of stepping pulse means 26 to designate the particular second at which a pulse is to be generated. For example, if a pulse is to be generated one second after midnight, switches 92 and 247 then are positioned in their first position, if a pulse is to be generated two seconds after midnight, switches 92 and 247 are positioned in their second position. There is a corresponding position of switches 92 and 247 for each second of a ten second period during which a pulse is to be generated.

It is believed desirable to give an example of the position of the various storage stepping switches for a particular time chosen at random. When a pulse is desired to be generated, for example, at 32 minutes and 26 seconds after 10 p.m., switches 102 and 234 are positioned in their number 3 position, switches 100 and 242 are positioned in their number 3 position and switches 98 and 244 are positioned in their number 4 position, switches 96 and 245 are positioned in their number 3 position, switches 94 and 246 are positioned in their number 3 position and switches 92 and 247 are positioned in their number 7 position.

When switch 288 is aligned with switch 234, switch 290 is aligned with switch 242, switch 292 is aligned with switch 244, switch 294 is aligned with switch 245, switch 296 is aligned with switch 246, and switch 298 is aligned with switch 247, a starting pulse is generated. Switch 298 is adapted to step, one step per second, continuously throughout a twenty-four hour period. Switch 296 is adapted to step one step for each ten seconds continuously throughout a twenty-four hour period. Switch 294 is adapted to step one step per minute continuously throughout a twenty-four hour period. Switch 290 is adapted to step once each hour continuously throughout a twenty-four hour period. Switch 288 is adapted to step once each ten hours for two steps and to step to a third position for the remaining four hours of a twenty-four hour period.

The P— terminal in Fig. 4 is connected in Fig. 5C through isolating rectifier 300 through terminal c and arm b of relay 302 to the coil of relay 308 to cause relay 308 to step switches 306 and 298 once each second. Switch 310 is cammed to the shaft of switches 298 and 306 to close momentarily when switches 298 and 306 reach their initial or starting position. Hence, switch 310 closes once each ten seconds to deliver a negative pulse through terminal c and arm b of relay 312 to the coil of relay 316 to cause switches 296 and 314 to step once each ten seconds.

Switch 320 is cammed to the shaft of switches 296 and 314 to close momentarily when switches 296 and 314 reach their initial or starting position. Hence, switch 320 closes once each minute to deliver a pulse through terminal 623, terminal c and b of relay 322 to the coil of stepping switch 326 to cause switches 294 and 324 to step one step each minute.

Switch 328 is cammed to the shaft of switches 294 and 324 to close momentarily once each ten minutes to deliver a negative pulse through terminal c and arm b of relay 330 to the coil of stepping switch 334 to cause switches 292 and 332 to step one step each ten minutes.

Switch 338 is cammed to the shaft of switches 292 and 332 to close momentarily once each hour to deliver a negative pulse through terminal 605 and terminal c and arm b of relay 340 to the coil of stepping switch 344 to cause switches 290 and 342 to step one step each hour.

Switch 346 is cammed to the shaft of switches 290 and 342 to close momentarily when switches 290 and 342 reach their initial or starting position to deliver a pulse through terminal c and arm b of relay 348 to the stepping coil of stepping switch 352 to cause switches 288 and 350 to index once each ten hours.

Because the day has a time duration of twenty-four hours rather than thirty hours, when stepping switches 288 and 350 move to their third position they convert relay 344 to a four position stepping switch.

When relay 344 is utilized as a ten position stepping switch, none of the active terminals of switch 342 are connected to anything because relay 354 and switch 358 are opened. When, however, switch 350 moves to its third active position, it places a momentary voltage upon relay 354 causing relay 354 to move into its arm downward position to connect stepping coil 352 to the number four position of stepping switch 342 through terminal a and arm b of relay 354 and terminal c and arm b of relay 348. Switch 342 continues to step once each hour. When switch 342 reaches its fourth position, it connects a brief pulse of voltage to the number four terminal of switch 342 which is channeled to the stepping switch of relay 352 to cause relay 352 to step to its initial or starting position. Switch 358 is cammed to the shaft of switches 288 and 350 to close momentarily when switches 288 and 350 reach their initial or starting position. When switch 358 closes, it connects a negative voltage to the terminals of positions 5, 6, 7, 8, 9 and 10 of switch 342. When switch 342 indexes an additional hour, it then is caused to index, due to the rapid operation of switch 360 to its initial or starting position.

Hence, a circuit has been created to cause the combination of stepping switches associated with relays 344 and 352 to count a twenty-four hour period.

When switches 288, 290, 292, 294, 296 and 298 are aligned with switches 234, 242, 244, 245, 246, 247, respectively, relays 134, 362, 364, 366, 368 and 370 are closed momentarily to create a series circuit to present a positive voltage at the coil of relay 376 and at rectifier 372 in Fig. 5C. This voltage is interrupted if relay 132 in Fig. 5B is in its arm downward position. When a voltage is applied to and closes relay 376 in Fig. 5C, a reset voltage is applied to stepping switch controls 180, 182, 184, 186, 188 and 190 to reset their corresponding storage stepping switches to their initial or starting position ready to receive additional pulse information from stepping pulse means 26. The voltage at terminal 611 is also utilized in connection with the equipment in Figs. 5F and 5J, as hereinafter described.

Relays 378 in Fig. 5C is connected to terminal P+ of Fig. 4 so that arm b contacts terminal a thereof once each second for a time duration equal to the length of pulse of voltage P+. Arm b of relay 378 is connected to terminal d of relay 374. When a pulse is delivered through rectifier 372 to the coil of relay 374, relay 374 closes momentarily to connect arm e to terminal d of relay 374 which causes relay 372 to remain closed for the entire duration of the voltage pulse P+. When relay 374 closes, the + terminal of Fig. 4 is connected through terminal a and arm b of relay 374 to terminal 613. The length of duration of the pulse which appear at terminal 613 is equal to the time duration of the voltage pulse P+. Hence, starting pulses are generated at terminals 611 and 613 as an output from a primary bank of storage stepping switches of the pulse means 11.

Returning to Figs. 5A, 5B and 5C, switches 302S, 312S, 322S, 330S, 340S, and 348S are manual switches adapted to energize relays 302, 312, 322, 330, 340 and 348, respectively when they are closed. The closing of these relays places a negative voltage on relay coils 308, 316, 326, 334, 344 and 352, respectively, to step them one step. By repeated manual operation of these switches their respective stepping switches can be stepped to zero and released together at a particular time. When the switches are released, the switches again start stepping.

*Switching means connected to turn pieces of equipment on and off*

In Fig. 5F is shown means for channeling control pulses to particular control means for controlling particular pieces of equipment, such as motion picture projectors, flood lights and the like.

Switches 104, 268 are positioned by stepping switch control 202 in response to the information in channel L of stepping pulse means 26, as heretofore described. When a voltage pulse appears at the terminal 611, it is channeled to stepping switch control 202 to reset control 202 to its initial or starting position. The pulse is also channeled through rectifier 381 and the movable arm of switch 268 to the particular terminal which switch 268 is in contact with. Each terminal of switch 268 is connected to a different set of relays to turn a different piece of equipment on. An example of one of these relays is shown at 380. When switch 268 is connected to its tenth terminal, and when a pulse appears at terminal 611, the voltage is channeled from terminal 611 through rectifier 381, the movable arm of switch 268 and the tenth terminal of switch 268 to close relay 380 to connect or turn on a predetermined piece of equipment. A holding voltage for relay 380 is connected through the contacts of relay 382 and contacts $a$, $b$ of relay 380 to hold relay 380 closed until relay 382 is energized. Obviously, each terminal of switch 268 can be connected to control a voltage responsive element which may be adapted to do anything that a relay or vacuum tube can do. For example, relays need not be used to close the circuit controlled by relay 380 but a vacuum tube, magnetic amplifier, or transistor circuit may alternatively be used.

Switches 106 and 270 are positioned by stepping switch control 204 in response to the information in channel M of stepping pulse means 26 as hereinbefore described. When a voltage appears at terminal 616 a resetting voltage is applied to stepping switch 204 which causes switches 106 and 270 to return to their initial or starting positions. This voltage is also channeled through rectifier 383, the movable arm of switch 270, to a relay such as relay 382 which is adapted to remove the holding voltage from relay 382 to thereby open the circuit to a predetermined piece of equipment. Only one set of relays 380 and 382 are shown herein by way of example only. This was done in the interest of space conservation and it was not considered necessary to repeat this circuitry connected to each of the ten taps of switches 268 and 270.

The pulse applied at terminal 611 was generated at terminal $a$ of relay 376 in Fig. 5C. Terminal 616 is connected to the terminal $a$ of relay 402 on Fig. 5G, whose connections and operations will be described hereinafter.

*Switching means for selecting video channels to be connected to and disconnected from a video transmitter*

In Fig. 5J, switches 108 and 282 are positioned by stepping switch control 214 in accordance with the information in channel N of stepping pulse means 26. When a voltage appears at terminal 611 from terminal $a$ of relay 376 in Fig. 5C, stepping switch 214 is connected to be reset to its initial or zero position. The voltage from terminal 611 is also channeled through rectifier 404 and the movable arm of switch 282 to a particular predetermined relay, for example, relay 406, which is adapted to close a circuit to connect a predetermined video channel to a video transmitter. A holding voltage for relay 406 is connected through the contacts of relay 410 and contacts $a$, $b$ of relay 406 to hold relay 406 closed until relay 410 is energized. In the interest of clarity in the drawings, additional relays similar to relay 406 are not shown connected to the other fixed terminals of switch 282. The other fixed terminals of switch 282 are, however, connected to relays which are identical with relay 406. It is to be noted that vacuum tubes, magnetic amplifiers, and transistor circuits which are the equivalent of relay 406 can be substituted for relay 406 to connect the video channel to a video transmitter.

Switches 110 and 284 are positioned by stepping switch control 216 in response to the information in channel 0 of stepping pulse means 26, as described hereinbefore. Each fixed terminal of switch 284 is connected to a relay similar to relay 410 to remove the holding voltage from relay 406 to thereby disconnect a predetermined video channel from its video transmitter. When a voltage pulse is received at terminal 645, it is channeled through the rectifier 406 to the movable arm of switch 284, then to the particular terminal to which arm 284 is in contact, for example, the first terminal which is shown connected to relay 410. Terminal 645 is connected to the movable arm of switch 408 in Fig. 5H to receive a pulse after a predetermined time delay, as described hereinafter. Stepping switch control 216 is connected through terminal 619 to timer controller 440 in Fig. 5H from which it receives its reset pulse.

*Timing means for delaying starting pulse for a predetermined period of time*

Switches 112 and 286 in Fig. 5J are positioned by stepping switch control 218 in response to the information on channel P of stepping pulse means 26, as described hereinbefore. The length of the time delay is determined by the position of switch 286. When switches 286 and 414 are aligned, any voltage which appears on the movable arm of switch 286 is connected to the movable arm of switch 414. Switch 414 is adapted to index one step per second after a starting pulse is received at terminal 611, which, in turn, is connected to terminal $a$ of relay 376 in Fig. 5C.

A typical ten second, or short delay timer is shown at 434 in Fig. 5J. In timer 434, terminal 611, from which a starting pulse is received, is connected to terminals $c$ and $i$ of relay 430. When a pulse is received at terminal 611, it is channeled through terminal $c$ and arm $b$ to the stepping coil of relay 430, which causes relay 430 to cycle and move to its arm downward position. When relay 430 is transferred to its arms downward position, timing pulses from terminal P— of Fig. 4 are connected through rectifier 436, terminal $d$ and arm $e$ of relay 430, and stationary terminals of switch 426 to the stepping coil of relay 428 to cause relay 428 to index switches 414, 424 and 426 one step each second.

When relay 430 is cycled to its arm downward position, terminal P+ of Fig. 4 is connected through terminal $g$ and arm $h$ of relay 430 to the movable arm of switch 286 so that when switches 286 and 414 come into alignment, the positive pulses from terminal P+ in Fig. 4 are connected to terminal 642.

When a pulse of voltage is realized at terminal 642, the voltage is also applied to terminal $c$ and arm $b$ of relay 432 to cause relay 432 to cycle into its arm downward position. When relay 432 moves into its arm downward position, the + terminal of Fig. 4 is connected through arm $e$ and terminal $d$ of relay 432, and through terminal $a$ and arm $b$ of relay 430 to the coil of relay 430, which causes relay 430 to transfer to its arm upward position. Positive voltage is also delivered from terminal $d$ of relay 432 to stepping switch control 218 and through terminal 618 to stepping switch control 208 in Fig. 5H to cause controls 218 and 208 to reset their stepping switches to their initial or starting position. The coil of stepping relay 428 is connected to the ground terminal through stepping switch 424, terminal $g$ and arm $h$ of relay 432 and through switch 438. Switch 438 is a type which causes pulses to be applied to switch 428 to step switch 428 to its initial or starting position. It is to be noted that the same reset pulse which causes stepping switch controls 218 and 208 to move their storage stepping switches to their initial or starting position also causes timer 434 to reset to its initial or starting position.

*Switching means for selecting an audio channel to be connected to and disconnected from an audio transmitter*

Switches 114 and 274 in Fig. 5H are positioned by stepping switch control 208 in accordance with the information in channel Q of stepping pulse means 26, as described heretofore. A voltage pulse from terminal 624, which is connected to the movable arm of switch 414 in Fig. 5J, is connected through rectifier 412 to the movable arm of switch 274 from whence it is channeled to a predetermined relay such as, for example, relay 416 to cause a circuit to close to connect a predetermined audio channel to an audio transmitter. A holding voltage for relay 416 is connected through the contacts of relay 422 and contacts $a$, $b$ of relay 416 to hold relay 416 closed until relay 422 is energized.

Switches 116 and 276 are positioned by stepping switch control 210 in response to the information in channel T of stepping pulse means 26. When a voltage pulse is applied from terminal 646, which is connected to the movable arm of switch 420 in Fig. 5G, through rectifier 418 to the movable arm of switch 276, it is channeled from the movable arm of 276 to a predetermined piece of equipment such as relay 422 which is adapted to remove the holding voltage from relay 416 to thereby disconnect a predetermined audio channel from an audio transmitter. A pulse appears at terminal 646 after a predetermined time relay determined by timing means 36 and timing means 39, as described hereinafter.

*Timing means for timing a program segment*

Timing means 36 is adapted to time a program segment. To that end, a time delay much greater than the ten second time delay of time delay means 434 is required. Timing means 36 is shown typically in Figs. 5D and 5E.

Switches 248, 130 and 250 are positioned by stepping switch control 192 in response to information on channel G of stepping pulse means 26; stepping switches 252, 128 and 254 are positioned by stepping switch control 194 in response to the information on channel H of stepping pulse means 26; stepping switches 256, 126 and 258 are positioned by stepping switch control 196 in response to the information on channel I of stepping pulse means 26; stepping switches 260, 124 and 262 are positioned by stepping switch control 198 in response to information on channel J of stepping pulse means 26; and stepping switches 264, 122 and 266 are positioned by stepping switch control 200 in response to information in channel K of stepping pulse means 26.

Stepping switch 460 is adapted to step one step for each second, after a starting pulse is received. The circuitry of ten position counter 470 sends a pulse to six position counter 472 at the end of each ten second interval. Six position counter 472 is adapted to step switches 476 one step each ten seconds.

At the end of one minute, six position counter 472 sends a pulse to ten position counter 488 which causes switch 492 to step one step each minute.

After ten minutes, ten position counter sends a pulse to six position counter 494 which causes switch 498 to step once each ten minutes. At the end of one hour, six position counter 494 sends a pulse to ten position counter 500 which causes switch 504 to step one step each hour.

The total counter, therefore, has a possible time delay of ten hours.

Ten position counters 488 and 500 are identical to ten position counter 470. Six position counter 494 is identical with six position counter 472.

Terminal c of relay 444 in Fig. 5E is connected through terminal 613 to arm b of relay 374 in Fig. 5C, from whence it receives a starting pulse. Terminal 613 is connected through terminal c and arm b to the coil of relay 444. When a starting pulse is received by relay 444, relay 444 moves into its arm downward position. When relay 444 moves to its arm downward position, the coil of relay 444 is connected through its terminal a and arm b to be reset by a positive voltage from the + terminal in Fig. 4 channel through arm h and terminal g of relay 454 when relay 454 moves into its arm downward position.

When relay 444 moves into its arm downward position, terminal P— of Fig. 4 is connected through terminal f and arm e of relay 454 and through arm e and terminal d of relay 444, thence through rectifier 506 to the stepping coil of stepping switch 464 to cause switches 460 and 462 to step once each second when a negative pulse is received from terminal P—.

Storage stepping switches 266, 262, 258, 254 and 250 are positioned to designate a predetermined time delay corresponding to a program segment. When timing switches 460, 476, 492 and 498 and 504 are aligned with these storage stepping switches, respectively, a positive pulse from terminal P+ of Fig. 4 is channeled from the movable arms of the storage stepping switches to the movable arms of the timer switches to cause output relays similar to relay 468 and 486 in Fig. 5E to close. The terminals of these output relays are connected in series with the + terminal of Fig. 4. When each timing switch is aligned with its corresponding storage stepping switch, all of the output relays are closed and a positive voltage is channeled through arm h and terminal g of relay 444 to terminal 615, which is the output terminal of timing means 36. When no time delay is required, each of the storage stepping switches are positioned at their initial or zero position to cause a positive voltage to be channeled through switches 248, 252, 256, 260 and 264 in series from terminal 613 in Fig. 5C.

After switches 460 and 462 have stepped through ten steps, switches 508 and 466, which are cammed to the shaft of switches 460 and 462, close momentarily. When switch 508 closes, a ground potential is applied through switch 465 to the stepping coil of relay 464 to cause relay 464 to step to its initial or starting position. Ten counter 470 is now in a position to count the next ten seconds. When switch 466 closes, a negative potential is applied through arm b and terminal c of relay 458 and through switch 466 to the stepping coil of stepping relay 482 to cause switches 476 and 478 to step one step.

The six position counters, such as counter 472, operate in the same fashion as the ten position counters except that the stepping switch has only six active terminals rather than ten active terminals. Stepping relay 482 receives a voltage pulse from switch 466 once each ten seconds which causes switches 476 and 478 to step. When switches 476 and 478 have stepped six steps, switches 483 and 484 close momentarily. Switch 483 causes relay 482 to step to its initial or zero position. Switch 484 delivers a pulse to ten position counter 488 once each minute.

When switch 492 reaches its initial or starting position once each ten minutes, it delivers a pulse to six position counter 494.

When switch 498 reaches its initial or starting position once each hour, it delivers a pulse to ten position counter 500 which counts the hours up to ten hours.

When an output pulse appears at terminal 615 either from switch 264 or from terminal g of relay 444, relay 456 closes momentarily to cause the + terminal of Fig. 4 to be connected through arm b and terminal a of relay 456 to reset stepping switch controls 200, 198, 196, 194 and 192.

The output pulse at terminal 615 is also connected through terminal c and arm b of relay 454 to cause relay 454 to close momentarily.

When relay 454 closes momentarily, arm b is connected to arm a thereof so that relay 454 is then reset when the next pulse appears from terminal P+ of Fig. 4. Further, when relay 454 moves into its arm downward position, the circuit through terminal f and arm e of relay 454 is opened thereby removing the timing pulses from ten position counter 470. When relay 454 moves into its arm downward position, a positive voltage is connected from the plus terminal of Fig. 4 through arm h and terminal g to the coil of relay 458 which opens the circuit between arm b and terminal c thereof to prevent further counting by six position counters 472 and 494 and by ten position counters 488 and 500. The + terminal is also connected through arm h and terminal g of relay 454, through terminal a and arm b of relay 444 to the coil of relay 444 to reset relay 444 into its arm upward position.

Relays 474, 490, 496 and 502 have their coils and their terminals a, b and c connected in parallel with the coil and terminals a, b and c, respectively, of relay 454.

When relays 454, 474, 490, 496 and 502 close, the actuating coil of ten position counters 470, 488 and 500 and of six position counters 472 and 494 are grounded to cause the counters to step their switches to their initial or starting position. For example, coil 464 in Fig. 5E of ten position counter 470 is connected through switch 465, arm *k* and terminal *j* of relay 454, and the movable arm of switch 462 to the ground terminal to cause relay 464 to step to its initial or starting position.

*Timing means for delaying the disconnecting of video and audio channels from their respective video and audio transmitters*

The output pulse from timing means 36 is connected through terminals 615 in Fig. 5E to timer controller 440 in Fig. 5H and 442 in Fig. 5G.

Switches 278, 118 and 280 are positioned by stepping switch control 212 in response to information in channel R of stepping pulse means 26. The position of switch 280 determines the amount of time delay and may be set for any period up to and including ten seconds. Timer controller 440 is identical with timer controller 444 in Fig. 5J. Timer controller 440 is adapted to step switch 408 one step per second after timer controller 440 receives a starting pulse from terminal 615 in Fig. 5E. When switches 280 and 408 are in the same position, voltage is connected from terminal P+ of Fig. 4 through timer controller 440 and the movable arm of switch 280 to the movable arm of switch 408 to generate an output pulse at terminal 645. Terminal 645 is connected to timer controller 440 to reset timer controller 440 when a pulse is received.

The movable arm of switch 408 is also connected through terminal 645 on Fig. 5J, through rectifier 406 to the movable arm of switch 284 thence to a relay such as relay 410 which is adapted to disconnect a predetermined video channel from a video transmitter.

The movable arm of switch 408 is connected through switch 445 of Fig. 5G, thence through rectifier 446 to arm *b* of relay 448. Timer controller 440 is also connected to terminal 619, to stepping switch control 216 of Fig. 5J, to reset control 216 to its initial or starting position when a pulse is generated upon the movable arm of switch 408.

Timer controller 442 is identical to timer controller 434 in Fig. 5J. A pulse is received through terminal 615 from Fig. 5E to Fig. 5G, thence to timer controller 442 causing timer controller 442 to start to step switch 420 one step each second. Switches 272, 120 and 274 are positioned by stepping switch control 206 in response to information in channel S in stepping pulse means 26.

Switch 274 may be set at any position to designate a particular time delay up to ten seconds. When switches 274 and 420 are aligned, pulsed positive voltage from terminal P+ of Fig. 4 is channeled through timer controller 442 to the movable arm of switch 274, thence to the movable arm of switch 420.

The output pulse from timing means 39 appears at terminal 646 and is carried through terminal 646 and rectifier 418 in Fig. 5H to the movable arm of switch 276, from whence it is channeled to a relay such as relay 422 which is adapted to disconnect a predetermined audio channel from an audio transmitter.

The movable arm of switch 420 is also connected to timer controller 442 to reset timer controller 442 to its initial or starting position. The voltage pulse appearing on the movable arm of switch 420 is also connected through timer controller 442 to terminal 617, thence to stepping switch control 210 in Fig. 5H to reset stepping switch control 210 to its initial or starting position.

The movable arm of switch 420 is further connected through rectifier 450 to arm *b* of relay 448.

*Gating means for generating a pulse when both video and audio channels are disconnected from their respective transmitters*

Pulses from the movable arm of switch 408 in Fig. 5H and from the movable arm of switch 420 in Fig. 5G are channeled through rectifiers 446, 450, respectively, to arm *b* of relay 448. Normally relay 448 is in its arm upward position so that these pulses are then channeled through terminal *c* of relay 448 to the coil of relay 452 causing relay 452 to move from its arm upward position to its arm downward position. When the next pulse is received, it is then channeled from arm *b* to terminal *c* of relay 448, thence through terminal *a* and arm *b* of relay 452 to the coil of relay 402 causing relay 402 to close and connect a positive voltage from terminal P+ of Fig. 4 to terminal 616.

When switches 280 and 274 in Figs. 5G and 5H are set for zero time delay, the coil of relay 448 is energized through a series connection of switches 272 and 278, which are in turn connected to the + terminal in Fig. 4, to cause relay 448 to close. When relay 448 closes, pulses which are received simultaneously through rectifiers 446 and 450 are channeled through arm *b* and terminal *a* of relay 448, and through terminal *c* and arm *b* of relay 452 to the coil of relay 402 causing relay 402 to close to connect P+ of Fig. 4 to terminal 616.

Terminal 616 is connected to stepping switch control 204 in Fig. 5F to cause control 204 to move its storage stepping switches to their initial or starting position. Terminal 616 is also connected through rectifier 383 to the movable arm of switch 270, thence to a particular relay, for example, relay 382, to disconnect a predetermined piece of equipment.

*Operation*

Assume that alternate bank 14 is controlling the program segment which is at the moment on the air. It is desired to turn a motion picture on at 7:29 p.m. and 55 seconds. It is further required to connect a video channel associated with the projector to its respective video transmitter precisely at 7:30 p.m. The audio channel associated with the moving picture projector is to be turned on at 7:30 p.m. and 5 seconds. The program segment is to run for 30 minutes from 7:30 p.m., at which time the video channel is to be disconnected, followed after a period of 5 seconds by the disconnecting of the audio channel. After the audio and video channels have been disconnected, the moving picture projector is to be turned off.

Since the alternate bank is occupied, the primary bank of switches is utilized. The storage stepping switches associated with channels A, B, C, D, E, and F are positioned to positions corresponding at 7:29 p.m. and 55 seconds. The storage stepping switches associated with channel L of stepping pulse means 26 are positioned to select the motion picture camera which is to be turned on. All other storage stepping switches remain at their initial or starting position. At precisely 7:29 p.m. and 55 seconds, a pulse is channeled from terminal 611 in Fig. 5C to Fig. 5F, thence to a relay similar to relay 380 and the motion picture camera is turned on. Pulses from terminal 611 immediately reset the storage stepping switches associated with channels A, B, C, D, E, F and L to their initial or starting position.

Since the alternate bank is still in use, channels A, B, C, D, E and F of stepping pulse means 26 position their storage stepping switches to correspond with a time of precisely 7:30 p.m. Since the program segment is to be exactly 30 minutes long, channels G, H, I, J and K position their associated storage stepping switches to correspond to a time delay of exactly 30 minutes. Channel L of stepping pulse means 26 keeps its switches in its initial or starting position. Channel M of stepping pulse means 26 positions its storage stepping switches to turn off the moving picture projector when a pulse is received at terminal 616. Channels N and O of stepping pulse means 26 position their storage stepping switches to connect the video channel associated with the moving picture projector to its respective video transmitter, and to disconnect the same video channel from its transmitter. Channel P of stepping pulse means 26 is positioned in its fifth position to generate a five second time delay between the connecting of the video channel to its video transmitter and the connecting of an audio channel to its audio transmitter. Channel Q of stepping pulse means 26 is positioned to select the audio channel associated with the moving picture projector previously turned on and connect it to an audio transmitter when a pulse is received from terminal 642 of Fig. 5J. Channel T of stepping pulse means 26 positions its storage stepping switches to disconnect the audio channel, associated with the motion picture projector, from its audio transmitter when a pulse is received from terminal 646 on Fig. 5G. Channel R of stepping pulse means 26 positions its associated storage stepping switches in their initial or zero position to provide no delay at the end of the program segment before the video channel is disconnected from its video transmitter. Channel S of stepping pulse means 26 positions its associated storage stepping switches to position 5 to give a five second delay between the disconnecting of the video channel and the disconnecting of the audio channel.

At precisely 7:30 p.m. a pulse is generated at terminals 611 and 613 in Fig. 5C, which is channeled to connect the video channel, associated with the motion picture projector, to its video transmitter. Pulses from terminals 611 and 613 are also channeled to Fig. 5E to start the timing of the program segment. A pulse from terminal 611 in Fig. 5C is also channeled to timer 434 in Fig. 5J to start timer 434 counting off the seconds.

After five seconds, timer 434 and its associated circuitry generate a pulse at terminal 642 which connects the sound or audio channel, of the motion picture projector to an audio transmitter.

After thirty minutes from the turning on of the video transmitter, a pulse is generated at terminal 615 on Fig. 5E which is delivered to timer controllers 440 and 442 on Figs. 5H and 5G, respectively. Since the storage stepping switches of channel R of Fig. 5H are set for zero time delay, a pulse is channeled immediately, without delay, to terminal 645, of Fig. 5J, to disconnect the video channel from its video transmitter.

The pulse which is channeled to timer controller 442 in Fig. 5G starts timer controller 442 counting the seconds. After timer controller 442 has counted five seconds, switches 274 and 420 come into coincidence and a pulse is generated at terminal 646 which is communicated to Fig. 5H to disconnect the audio channel from the audio transmitter. Pulses from terminal 645 on Fig. 5H and from the movable arm of switch 420 on Fig. 5G are channeled through rectifiers 446 and 450 to arm *b* of relay 448 in Fig. 5G. The first pulse arrives at arm *b* of relay 448 through rectifier 446 at precisely 8:00 p.m. and closes relay 452. The second pulse arrives at 5 seconds after 8:00 p.m. through rectifier 450 and is channeled to close relay 402 to thereby generate a pulse at terminal 616. Terminal 616 is connected, in Fig. 5F, to channel a pulse to turn off the motion picture projector.

Referring now, briefly, to Fig. 5F, relays 380 and 382 together with the piece of equipment, for example, a motion picture projector these relays control can be considered a group of pieces of equipment to be controlled. Relays 380 and 382 are control elements within the particular group shown. Each group could include additional pieces of equipment, for example, a lamp in parallel with the previously mentioned motion picture projector, adapted to be controlled by control elements 380 and 382. Each group can include more than two control elements, for example, one control element to dim a light and another to turn it on and off, or it can have just one control element.

As so modified, the programmer of this invention need not be utilized to control a television or broadcast system but may be utilized, for example, to control any timed sequence of electrically controllable events.

Thus, the programmer of this invention provides a means for controlling a timed sequence of electrically controllable events, and is particularly adapted to control an unattended television broadcasting station.

Mechanical relays of the type utilized in the preferred embodiment of this invention are very reliable and require a minimum of maintenance.

There has thus been provided a complete television station control package which is particularly valuable to small stations because it can be operated with greatly improved accuracy of program switching and with a minimum of attendance.

Although a particular embodiment of this invention has been described in the specification and shown in the drawings, by way of example only, it is not intended that the invention should be limited thereto, but only in accordance with the spirit and scope of the following claims.

What is claimed is:

1. An electrical control for programming a series of events to be performed by a plurality of pieces of equipment which are to be connected for use at predetermined times, the combination comprising a timed stepping switch mechanism having a plurality of contacts, said mechanism having a unique position corresponding to each time unit of short duration in the program interval so that said contacts in said unique positions are activated at predetermined intervals during a program period, an adjustable stepping switch mechanism having a plurality of contact positions representing different time intervals in said program period, said adjustable stepping switch mechanism having banks of contacts permanently connected to corresponding banks of contacts of said timed stepping switch mechanism, means for positioning said adjustable switch mechanism to select a predetermined time interval in said program period, equipment to be controlled at said predetermined time intervals by said adjustable switch mechanism, means for selecting the said equipment to be controlled and relay means connected to control said selected equipment, said relay means being connected to be controlled when a unique position of said timed stepping switch mechanism corresponds to the position to which said adjustable switch mechanism is adjusted.

2. An electrical control for programming a series of events to be performed by a plurality of pieces of equipment which are to be connected for use at predetermined times, the combination comprising a timed stepping switch mechanism having a plurality of contacts, said mechanism also having contact wiper means and means for periodically advancing said wiper means over said contacts, a first adjustable stepping switch mechanism and a second adjustable stepping switch mechanism, each of said mechanisms having a plurality of contact positions representing different time intervals in said program period, said timed stepping switch mechanism and said first and said second adjustable switch mechanisms having banks of corresponding contacts and means for connecting said banks of corresponding contacts, means for adjusting said adjustable switch mechanisms to perform control functions at different selected time intervals in said program period, and equipment to be controlled at said predetermined time intervals connected to be controlled by said adjustable switch mechanisms.

3. An electrical control for programming a series of events to be performed by a plurality of pieces of equipment which are to be turned on and off at predetermined times, the combination comprising timing means for dividing a predetermined interval during which a series of events are to be programmed, into time units of short duration, said timing means having stepping switching means, said stepping switching means having a unique position for each of said time units of short duration, adjustable switching means, means for selectively connecting equipment to be programmed to said adjustable switching means, said adjustable switching means and said stepping switching means each having stepping switches with banks of corresponding contacts thereof interconnected, means for selectively positioning said stepping switches of said adjustable switch means to be electrically activated at certain times during the program so that when a unique position of said timed stepping switching means corresponds to a said selected position of said adjustable switching means, said adjustable switching means is electrically activated and said equipment is controlled.

4. An electrical control for programming a series of events to be performed by a plurality of pieces of equipment which are to be turned on and off at predetermined times, the combination comprising timed switching means for dividing a predetermined interval during which a series of events are to be programmed, into time units of short duration, settable switching means connected to said timed switching means, means for selectively connecting equipment to be programmed to said settable switching means, means for returning said settable switching means to an initial starting position each time before said settable switching means is set for programming said equipment, said settable switching means having contacts corresponding to the time units of short duration into which said predetermined time interval is divided, means for selecting said contacts to be activated at a predetermined time in said time interval by said timed switching means, switching means to select equipment to be controlled and means responsive to said timed switching means and to said settable switching means for controlling said equipment.

5. An electrical control for programming a series of events to be performed by a plurality of pieces of equipment which are to be turned on and off at predetermined times, the combination comprising timing switching means for dividing a predetermined interval during which a series of events are to be programmed, into time units of short duration, settable switching means connected to said timing means, electrical connections for connecting equipment to be programmed to said settable switching means, said settable switching means comprising a plurality of banks of settable stepping switches, each of said banks of switches having a wiper contact and a plurality of stationary contacts adapted to be contacted by said wiper contact, means for setting said wiper contacts of said banks of switches to occupy positions corresponding to a predetermined time in the time interval covering the program time at which predetermined time a certain piece of said equipment is to be controlled, said timing switching means comprising a plurality of banks of timed stepping switches corresponding to the banks of settable stepping switches, timed switches having a wiper contact and a plurality of stationary contacts, connections for connecting the corresponding stationary contacts of said banks of settable switch and said banks of timed switches together whereby when the wiper contacts of said timed stepping switches are engaging contacts associated therewith that are connected to contacts of said settable stepping switches to which the wiper contacts associated therewith are set said equipment to be programmed is controlled.

6. An electrical control for programming a series of events to be performed by a plurality of pieces of equipment which are to be turned on and off at predetermined times, the combination comprising timing means for dividing a predetermined interval during which a series of events are to be programmed, into time units of short duration, said timing means having stepping switching means, said stepping switching means having a unique position for each of said time units of short duration, adjustable switching means, connecting means for selecting equipment to be programmed, said connecting means connected to be controlled by said adjustable switching means, said adjustable switching means and said stepping switching means each having stepping switches with banks of corresponding contacts thereof interconnected, means selectively positioning said stepping switches of said adjustable switch means to be electrically activated at certain times during the program so that when a unique position of said timed stepping switching means corresponds to a selected position of said adjustable switching means said adjustable switching means electrically energizes said connecting means and said equipment is controlled.

7. An electrical control for programming a series of events to be performed by a plurality of pieces of equipment which are to be turned on and off at predetermined times, the combination comprising timing means for dividing a predetermined interval during which a series of events are to be programmed, into time units of short duration, said timing means having stepping switching means, said stepping switching means having a unique position for each of said time units of short duration, adjustable stepping switches, electrical connections for connecting equipment to be programmed to said adjustable switching means, means selectively positioning said stepping switches of said adjustable switches to be electrically activated at a predetermined time during the program, relay means connected to equipment to be controlled and means for energizing said relay means when a unique position of said timed stepping switching means corresponds to a selected position of said adjustable switches.

8. An electrical control for programming a series of events to be performed by a plurality of pieces of equipment which are to be connected for use at predetermined times, the combination comprising a timed stepping switch mechanism having a plurality of contacts, said mechanism having a unique position corresponding to each time unit of short duration in the program interval so that said contacts are in said unique positions at a predetermined interval during a program period, a settable stepping switch mechanism having a plurality of contact positions representing different time intervals in said program period, said settable stepping switch mechanism having banks of contacts permanently connected to corresponding banks of contacts of said timed stepping switch mechanism, means for positioning said settable switch mechanism to select a predetermined time interval in said program period, equipment to be controlled at said predetermined time interval, means for selecting the said equipment to be controlled and relay means connected to control said selected equipment, said relay means being connected to be controlled when a unique position of said timed stepping switch mechanism corresponds to the position to which said settable switch mechanism is set, and means for positioning said settable switch mechanism at an initial starting position after said equipment is controlled.

9. An electrical control for programming a series of events to be performed by a plurality of pieces of equipment which are to be connected for use at predetermined times, the combination comprising a timed stepping switch mechanism having a plurality of contacts, said mechanism having a unique position corresponding to each time unit of short duration in the program interval so that said contacts are in said unique positions at a predetermined interval during a program period, a settable stepping switch mechanism having a plurality of contact positions representing different time intervals in said program period, means for positioning said settable switch mechanism to select a predetermined time interval in said program period, equipment to be controlled at said predetermined time interval by said settable switch mechanism, means for selecting the said equipment to be controlled and relay means connected to control said selected equipment, means connected to said switch mechanisms so that said relay means is controlled when a unique position of said timed stepping switch mechanism corresponds to the position to which said settable switch mechanism is set, and means for positioning said settable switch mechanism at an initial starting position after said equipment is controlled.

10. Electrical control apparatus for operating a plurality of units of equipment at predetermined times in a program period which comprises a timed stepping switch having a unique position for each small interval of time in said program period, means for sequentially moving said timed stepping switch one step during each of said small intervals of time, an adjustable switch having a unique position for each position of said timed stepping switch, positioning means for moving said adjustable switch to the position corresponding to a predetermined time interval of said timed stepping switch during which a unit of said equipment is to be operated, selecting means for selecting a unit of said equipment to be operated during said predetermined time interval, starting pulse means connected through said timed stepping switch and said adjustable switch to generate a starting pulse when said timed stepping switch is in a position corresponding to the position of said adjustable switch, control means responsive to said starting pulse for starting operation of said selected unit of equipment, an adjustable delay timer responsive to said starting pulse to generate a stopping pulse at a predetermined time after said starting pulse, and stopping means responsive to said stopping pulse for stopping operation of said selected unit of equipment.

11. The control apparatus of claim 10 characterized further by the inclusion of means responsive to said starting pulse for resetting said adjustable switch to an initial position, means responsive to said stopping pulse for resetting said selecting means and said adjustable delay timer to initial positions, and position responsive means actuated automatically when said adjustable switch, said selecting means, and said adjustable delay timer are in said initial position for channeling resetting signals to said positioning means, said selecting means and said adjustable delay timer to select a second unit of equipment to be started at a second predetermined time and operated for a second predetermined period.

12. The control apparatus of claim 10 in which said selected unit of equipment comprises first and second elements of equipment to be operated for overlapping times, said control means comprises primary means for starting operation of said first element immediately upon generation of said starting pulse and secondary delay means for starting operation of said second element a short time after generation of said starting pulse, and said stopping means comprises primary means for stopping operation of said first element immediately upon generation of said stopping pulse and secondary delay means for stopping operation of said second element a short time after generation of said stopping pulse.

13. The control apparatus of claim 12 characterized further by the inclusion of a third element of equipment in said unit of equipment adapted to be turned on prior to generation of said starting pulse, means responsive to said starting pulse for resetting said adjustable switch to an initial position, means responsive to said stopping pulse for resetting said adjustable delay timer to an initial position, means responsive to said operation of both said primary stopping means and said secondary delay stopping means for turning off said third element of equipment and resetting said selecting means to an initial position, and position responsive means actuated automatically when said adjustable switch, said selecting means, and said adjustable delay timer are in said initial positions for actuating said positioning means, said selecting means, and said adjustable delay timer to select a second unit of equipment to be started at a second predetermined time interval and operated for a second predetermined period.

14. Electrical control apparatus for operating automatically the equipment of a television broadcasting station which comprises a timed stepping switch having a unique position for each second in the broadcasting day of said station, means for sequentially moving said timed stepping switch one step each second of said broadcasting day, first and second banks of control switches each bank connected to every unit of equipment to be operated automatically by this apparatus, each of said banks being substantially identical to the other bank and comprising; an adjustable switch having a unique position for each position of said timed stepping switch, means connecting corresponding positions of said adjustable switch and said timed stepping switch, positioning means for moving said adjustable switch to the position corresponding to a predetermined second of said timed stepping switch during which it is desirable to start using in transmitting a program, selecting a unit of equipment in transmitting a program, selecting means for selecting a unit of equipment to be operated, starting pulse means connected through said timed stepping switch and said adjustable switch to generate a starting pulse when said timed stepping switch is in a position corresponding to the position of said adjustable switch, control means responsive to said starting pulse for starting operation of said selected unit of equipment, an adjustable delay timer responsive to said starting pulse to generate a stopping pulse at a predetermined time after said starting pulse, and stopping means responsive to said stopping pulse for stopping operation of said selected unit of equipment.

15. The control apparatus of claim 14 characterized further by the inclusion of means responsive to said starting pulse for resetting said adjustable switch to an initial position, means responsive to said stopping pulse for resetting said selecting means and said adjustable delay timer to initial positions, and position responsive means actuated automatically when said adjustable switch, said selecting means, and said adjustable delay timer are in said initial positions for channeling resetting signals to said positioning means, said selecting means and said adjustable delay timer to select a second unit of equipment to be started at a second predetermined time and operated for a second predetermined period.

16. The control apparatus of claim 15 characterized further by the inclusion of information storage means common to both banks of switches and bank selector means responsive to resetting signal from the position responsive means of both banks for channeling information from said storage means to the bank of switches from which it receives a resetting signal.

17. The control apparatus of claim 14 characterized further in that said selected unit of equipment comprises audio and video channels of a piece of equipment, said control means comprises primary means for connecting said video channel to a video transmitter immediately upon generation of said starting pulse and secondary delay means for connecting said audio channel to an audio transmitter a short time after generation of said starting pulse, and said stopping means comprises primary means for disconnecting said video channel from said video transmitter immediately upon generation of said stopping pulse and secondary delay means for disconnecting said audio channel from said audio transmitter a short time after generation of said stopping pulse.

18. The control apparatus of claim 17 characterized further in that said selected unit of equipment includes a main power switch adapted to be turned on prior to generation of said starting pulse and each of said banks of switches includes means responsive to said starting pulse for resetting said adjustable switch to an initial position, means responsive to said stopping pulse for resetting said adjustable delay timer to an initial position, means responsive to both said primary stopping means and said secondary delay stopping means for turning off said main power switch and resetting said selecting means to an initial position, and position responsive means actuated automatically when said adjustable switch, said selecting means, and said adjustable delay timer are in said initial positions for actuating said positioning means, said selecting means, and said adjustable delay timer to select a second unit of equipment, the audio and video channels of which are to be connected to transmitter by a second starting pulse and disconnected by a second stopping pulse.

References Cited in the file of this patent

UNITED STATES PATENTS

| | | |
|---|---|---|
| 1,772,165 | Taylor | Aug. 5, 1930 |
| 1,810,732 | Sanner | June 16, 1931 |
| 2,403,561 | Smith | July 9, 1946 |
| 2,501,274 | Hamilton | Mar. 21, 1950 |
| 2,542,188 | Gates | Feb. 20, 1951 |
| 2,697,746 | Kennedy | Dec. 21, 1954 |
| 2,780,679 | Vandivere | Feb. 5, 1957 |